Sept. 28, 1937.  J. S. PARSONS  2,094,372
NETWORK SYSTEM OF DISTRIBUTION
Filed July 30, 1932   4 Sheets-Sheet 1

WITNESSES:

INVENTOR
John S. Parsons.
BY
ATTORNEY

Sept. 28, 1937.   J. S. PARSONS   2,094,372
NETWORK SYSTEM OF DISTRIBUTION
Filed July 30, 1932   4 Sheets-Sheet 3

WITNESSES:

INVENTOR
John S. Parsons.
BY
ATTORNEY

Sept. 28, 1937. J. S. PARSONS 2,094,372
NETWORK SYSTEM OF DISTRIBUTION
Filed July 30, 1932 4 Sheets-Sheet 4

WITNESSES:

INVENTOR
John S. Parsons.
BY
ATTORNEY

Patented Sept. 28, 1937

2,094,372

UNITED STATES PATENT OFFICE 2,094,372

NETWORK SYSTEM OF DISTRIBUTION

John S. Parsons, Swissvale, Pa., assignor to Westinghouse Electric & Manufacturing Company, East Pittsburgh, Pa., a corporation of Pennsylvania Application July 30, 1932, Serial No. 627,082

31 Claims. (Cl. 175—294)

My invention relates to alternating-current systems of distribution and particularly to such systems in which control currents of other-than-normal frequency are superimposed on the feeders or other main conductors of the system for the purpose of controlling the opening and closing of circuit breakers located at points remote from the generating station or substations. In its more specific aspects the invention relates to alternating-current network distribution systems of the general type disclosed in my prior Patents No. 1,953,126, issued April 3, 1934, and No. 2,018,225, issued October 22, 1935, both assigned to Westinghouse Electric & Manufacturing Company.

The system of the present application differs from those of the above-mentioned patents, among other particulars, in the manner of controlling the opening and closing of the network circuit breakers. In the normal operation of the present system, the network circuit breakers are both opened and closed in response to the application of other-than-normal frequency control currents to the feeders for a relatively short time interval. Other distinctions will become evident from the detailed description given below.

One object of the present invention is to provide an other-than-normal frequency control means for the network circuit breakers, included in an alternating-current system of distribution, for effecting the automatic control of both the closing and the opening of the network circuit breakers in response to successive applications of the control currents to the feeder circuits in the system.

Another object of the present invention is to provide an other-than-normal frequency control and protective means for an alternating-current system of distribution which avoids the necessity of providing blocking tuned circuits in the feeder circuits included in the distribution system.

Another object of the present invention is to provide an other-than-normal frequency control and protective means for an alternating-current system of distribution, wherein the other-than-normal frequency currents are adapted to be superimposed upon one end of the feeder circuits in order to control the closure of the network circuit breakers, and means for applying the other-than-normal frequency control currents to both ends of the feeder circuits for the purpose of controlling the opening of the network circuit breakers.

Another object of the present invention is to simplify the relay control arrangement associated with the network circuit breakers, included in an alternating-current system of distribution, in such a manner that a minimum amount of maintenance is required for each network circuit breaker unit installation.

Another object of the present invention is to provide means for effecting loop circuits between feeder circuits energized from different sources or buses and adapted to supply power to a common network load circuit.

A further object of the present invention is to provide means for determining when a fault occurs on any of the feeder circuits connected to supply power to a common network load circuit, and means for effecting the opening of the network circuit breakers associated with only the faulty feeder circuit.

A further object of the present invention is to provide relay means associated with the feeder circuit breakers, included in the feeder circuits adapted to supply power to a common network load circuit, such relay means being arranged to control the superimposing of the other-than-normal frequency control currents on the feeder circuits only when the associated feeder circuits are isolated from their associated sources or buses or when a feeder is to be connected to a deenergized network.

A further object of the present invention is to provide an other-than-normal frequency control and protective scheme for an alternating-current system of distribution so arranged that the network circuit breakers, associated with any of the feeder circuits, may be actuated to their open or closed positions at the will of a central station operator.

Further objects and advantages of the present invention will become readily apparent from a detailed description of a preferred embodiment, wherein Figure 1 is a single-line diagrammatic illustration of an alternating-current system of distribution and the general arrangement of the other-than-normal frequency control and protective means associated therewith;

Figure 1:
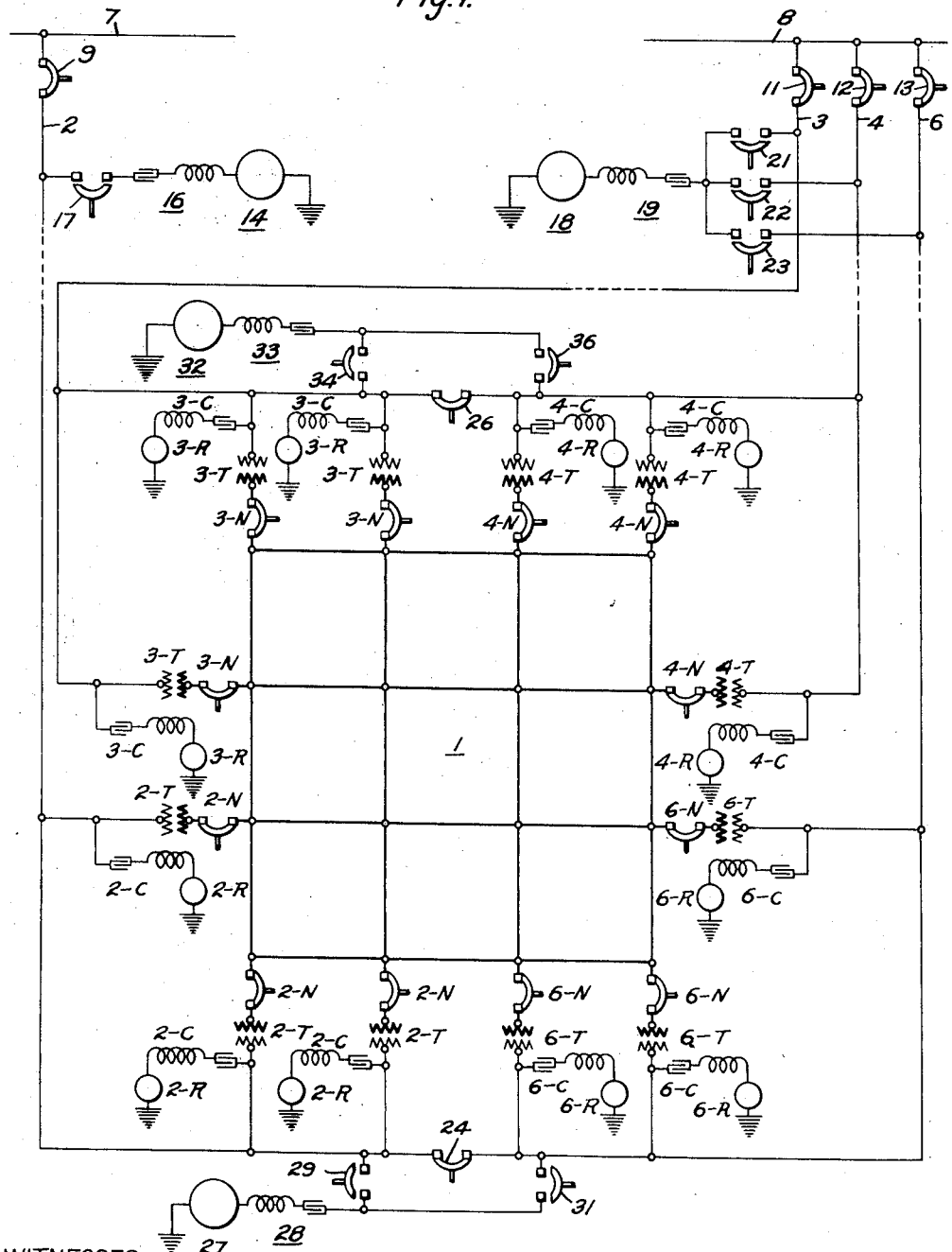

Referring more particularly to Fig. 1 of the drawings, a network load circuit 1, comprising a plurality of interconnected secondary leads, is provided for the purpose of supplying a proper utilization voltage for consumers. A plurality of feeder circuits 2 and 3, 4, 6 are adapted to be energized from sources or buses 7 and 8, respectively, through feeder circuit breakers 9 and 11, 12, 13, respectively. Each of the feeder circuits 2, 3, 4 and 6 are adapted to be connected to supply power to the network load circuit 1 through suitable distribution transformers and network circuit breakers.

The distribution transformers associated with each of the feeder circuits are indicated by the reference numeral of the feeder circuit and the letter T, and the network circuit breakers associated with the respective feeder circuits are indicated by the reference numeral of the feeder circuit and the letter N.

An other-than-normal frequency current source is indicated as a high-frequency generator 14, which is adapted to be connected to the feeder circuit 2 for the purpose of superimposing the other-than-normal frequency control currents upon such feeder circuit. The source 14 is adapted to be connected to the feeder circuit 2 through a tuned circuit 16, comprising a series connected inductance and a capacitance, and through a circuit breaker 17. A second other-than-normal frequency current source 18 is adapted to be connected to the feeder circuits 3, 4 and 6 through a tuned circuit 19, comprising a series connected inductance and a capacitance, and through circuit breakers 21, 22 and 23, respectively.

The tuned circuits 16 and 19 are so designed that they offer a high impedance to the flow of normal frequency currents, or the current adapted to be supplied by the sources or buses 7 and 8, and a minimum impedance to the flow of the other-than-normal frequency currents supplied by the sources 14 and 18, respectively. Since the closing and opening of the network circuit breakers is controlled by relay apparatus responsive to the other-than-normal frequency currents supplied by the sources 14 or 18, such relay apparatus is illustrated generically as comprising high-frequency relays. The high-frequency relays associated with the network transformer and network circuit breaker unit installations are indicated generically by means of the numeral of the associated feeder circuit and the letter R. The high-frequency relays are adapted to be connected to the associated feeder circuits on the primary side of the network transformers through suitable tuned circuits indicated by the reference numeral of the associated feeder circuit and the letter C. Each of the tuned circuits associated with the high-frequency relays comprises a series connected inductance and a capacitance which are tuned to offer a high impedance to the flow of normal frequency and a minimum impedance to the other-than-normal frequency currents generated by sources 14 or 18.

In the network arrangement illustrated in this figure, the feeder circuits 2 and 6 are adapted to be connected at the network load circuit ends thereof for the purpose of providing a loop circuit, and the feeder circuits 3 and 4 are adapted to be connected at the network load circuit ends thereof to provide a second loop circuit. Circuit breakers 24 and 26 are associated with the network load circuit ends of the feeder circuits 2, 6 and 3, 4, respectively, and are adapted to connect the feeder circuits 2, 6, and 3, 4 when the sources or buses associated with such feeder circuits are synchronized.

A third other-than-normal frequency source 27 is associated with the network load circuit ends of the feeder circuits 2 and 6, and is adapted to supply the other-than-normal frequency control currents to such feeder circuits through a tuned circuit 28, comprising a series connected inductance and a capacitance, and through circuit breakers 29 and 31, respectively.

A fourth other-than-normal frequency current source 32 is associated with the network load circuit ends of the feeder circuits 3 and 4, and is adapted to supply the other-than-normal frequency currents to such feeder circuits through a tuned circuit 33, comprising a series connected inductance and a capacitance, and through circuit breakers 34 and 36.

In the network system arrangement shown in this figure of the drawings, the feeder circuit breakers 9, 11, 12 and 13 are shown in their closed positions, and the feeder circuits 2, 3, 4 and 6 are connected to supply power to the common network load circuit 1 through their associated network transformers and network circuit breakers. Inasmuch as the feeder circuit breakers are in their closed positions, the circuit breakers 17, 21, 22 and 23 are shown in their open positions, and no other-than-normal frequency control currents are supplied to the feeder circuits from the other-than-normal frequency current sources 14 and 18.

The relay control apparatus associated with the network transformer and network circuit breaker unit installations is arranged to be responsive to the other-than-normal frequency control currents for both the closing and opening operations of the network circuit breakers. Since a fault on any of the feeder circuits may frequently shunt a substantial amount of the other-than-normal frequency control currents supplied by the sources 14 or 18, it is necessary to provide the other-than-normal frequency current sources 27 and 32, associated with the network load circuit ends of the feeder circuits, to insure the effective energization of the high-frequency relays associated with a faulty feeder circuit.

Under normal system conditions, when the feeder circuits 2, 3, 4 and 6 are supplying power to the network load circuit 1, the circuit breakers 24 and 26 are in their closed positions, thereby completing loop circuits between the feeder circuits 2, 6 and 3, 4, respectively. The circuit breakers 29, 31, 34 and 36 are in their open positions, and the high-frequency generators 27 and 32 are disconnected from the network load circuit ends of their associated feeder circuits.

The method of control for the distribution system shown in Fig. 1 will now be detailed for various possible system conditions. Assuming that the feeder circuit breakers 9, 11, 12 and 13 are in their open positions, the network load circuit 1 completely deenergized, and the circuit breakers 24 and 26 in their open positions, the central station operator connects the feeder circuit 2 to supply power to the network load circuit 1 through its associated network transformers 2—T and network circuit breakers 2—N by means of the following sequence of control operation.

The circuit breaker 17 is actuated to its closed position by any suitable manual or automatic means, thereby connecting the high-frequency generator 14 to supply the other-than-normal frequency control currents to the feeder circuit 2. The application of the other-than-normal frequency currents to the feeder circuit 2 effectively energizes the high-frequency relays 2—R at the network load circuit end of the feeder circuit, and a circuit is partially completed for the closing of the network circuit breakers 2—N. The central station operator then closes the feeder circuit breaker 9, and the distribution transformers 2—T are energized from the source of bus 7. The energization of the secondary side of the transformers 2—T completes an energizing circuit for the closing coils of the circuit breakers 2—N, with the result that the network circuit breakers are actuated to their closed positions and the feeder circuit 2 is connected to both the bus or source 7 and the network load circuit 1 to supply power to the network load circuit. The other-than-normal frequency control currents are applied to the feeder circuit 2 for only a predetermined time and then automatically removed.

The circuit breaker 24 will remain in its open position due to the absence of potential on the network load circuit end of feeder circuit 6, and the circuit breakers 29 and 31 remain in their open positions.

The opening of the feeder circuit breaker 9 is controlled by suitable overcurrent relay means, and this circuit breaker is adapted to be actuated to its open position in the event of predetermined overcurrent conditions existing on the feeder circuit 2, or when the central station operator desires to disconnect the feeder circuit 2 from the network load circuit 1 for any reason whatever. Assuming a fault to occur on the feeder circuit 2, such that the overcurrent relay means associated with the feeder circuit 9 are effectively energized, the feeder circuit breaker 9 is actuated to its open position, and the circuit breaker 17 is automatically closed to connect the high-frequency generator 14 to the feeder circuit 2.

Since the network load circuit 1 was energized only from the feeder circuit 2, and the feeder circuit breaker 9 has been actuated to its open position in response to the fault condition existing on the feeder circuit, the application of the high-frequency control currents to the feeder circuit 2 merely results in the possible effective energization of one or more of the high-frequency relays 2—R, depending upon the amount of such control currents which are shunted by the fault. However, since there is no voltage existing on either side of the transformers 2—T, the network circuit breakers 2—N remain in their closed positions, and the circuit breaker 17 is automatically actuated to its open position to disconnect the high-frequency generator from the feeder circuit 2 after a predetermined time.

The possibility of a fault existing on the feeder circuit 2, and of the network load circuit 1 being energized from only the feeder circuit 2 is very remote, and for all practical purposes may be considered as an impossible system condition. However, the condition of the network circuit breakers 2—N remaining in their closed positions, when the feeder circuit breaker 9 has been actuated to its open position in response to a fault or predetermined abnormal condition existing on the feeder circuit 2, does not present any disadvantages. Under such conditions the network circuit breakers 2—N will be actuated to their open positions, to isolate the feeder circuit 2, when the network load circuit 1 is energized from one or more of the remaining feeder circuits 3, 4 and 6. The function of the relay control apparatus associated with the high-frequency generators 27 and 32 and their associated circuit breakers 29, 31 and 34, 36, respectively, will be detailed hereinafter, and the manner of effecting the opening of the network circuit breakers 2—N will be explained at that time.

For present purposes of explanation, it is only necessary to assume that the network load circuit 1 is energized from one or more of the feeder circuits connected to the source or bus 8, whereupon the circuit breaker 29 is actuated to its closed position to superimpose the high-frequency currents, generated by the high-frequency generator 27, upon the network load circuit end of the feeder circuit 2. Upon the application of the high-frequency currents to the network load circuit end of feeder circuit 2, the high-frequency relays 2—R are effectively energized to partially complete a tripping circuit for the network circuit breakers 2—N, and the presence of potential on the network load circuit 1 results in the actuation of the network circuit breakers 2—N to their open positions, thereby completely isolating the feeder circuit 2 from both the bus or source 7 and the network load circuit 1.

Assuming next that the network load circuit 1 is completely deenergized, the feeder circuit breakers 9, 11, 12 and 13 in their open positions, and that it is desired to connect the feeder circuit 3 to supply power to the network load circuit 1, the sequence of control may be explained briefly as follows.

The central station operator closes the circuit breaker 21, thereby applying the other-than-normal frequency currents, generated by the high-frequency generator 18, upon the feeder circuit 3, with the result that the high-frequency relays 3—R are effectively energized to partially complete a closing circuit for the network circuit breakers 3—N. The central station operator then closes the feeder circuit breaker 11 thereby energizing the network transformers 3—T and a potential exists for the closing of the network circuit breakers 3—N, which are thereupon actuated to their closed positions, and the circuit breaker 21 is actuated to its open position, after a short time delay, in order to disconnect the high-frequency generator 18 from the feeder circuit 3.

The network load circuit 1 is, therefore, energized from the source or bus 8 through the feeder circuit 3. Assuming that it is now desired to connect an additional feeder circuit 4 to supply power to the network load circuit 1, the sequence of control operation is substantially the same as that described with reference to the connection of feeder circuit 3 to supply power to the network load circuit 1.

Briefly, the central station operator closes the circuit breaker 22 thereby applying the high-frequency currents to the feeder circuit 4 and effectively energizing the high-frequency relays 4—R. Due to the presence of potential on the network load circuit 1, the closing circuits for the network circuit breakers 4—N are completed, and the network circuit breakers 4—N are actuated to their closed positions. Since the feeder circuits 3 and 4 are adapted to be connected together at the network load circuit ends thereof by means of the circuit breaker 26, the relay control apparatus associated with this circuit breaker is effective to actuate this circuit breaker to its closed position, inasmuch as the same voltage appears on both sides thereof. At this time, the network load circuit 1 is energized by the feeder circuit 3, and the network circuit breakers 4—N are all actuated to their closed positions. The central station operator now closes the feeder circuit breaker 12 without any synchronizing being necessitated, inasmuch as the feeder circuits 3 and 4 are both adapted to be connected to the same source or bus 8.

The feeder circuit 6 may also be connected to the network load circuit 1 in a manner similar to that described with reference to the connection of feeder circuit 4. However, the circuit breaker 24 will remain in its open position in view of the fact that there is absence of potential on the network load circuit end of feeder circuit 2.

Next, assuming that the network load circuit 1 is energized from the feeder circuits 3 or 4, and that it is desired to connect the feeder circuit 2 to supply power to the network load circuit 1, the sequence of control operation is as follows.

The central station operator closes the circuit breaker 17, thereby applying the high-frequency currents to the feeder circuit 2, and the high-frequency relays 2—R are effectively energized to complete a closing circuit for the network circuit breakers 2—N. Inasmuch as the network load circuit 1 is energized from the feeder circuits 3 and 4, a potential exists for energizing the closing circuits associated with the network circuit breakers 2—N, and these network circuit breakers are actuated to their closed positions. The circuit breaker 24 remains in its open position due to the absence of potential on the network load circuit end of feeder circuit 6, and the transformers 2—T are energized from the energized network load circuit. A voltage proportional to the network load circuit voltage now exists on the transformer side of the open feeder circuit breaker 9, and the central station operator synchronizes the voltage of the source of bus 7 with this voltage. When the two voltages bear a predetermined permissible magnitude and phase angle relation, the central station operator closes the feeder circuit breaker 9, and the network load circuit 1 is energized from the two independent sources or buses 7 and 8.

The remaining feeder circuit 6 may now be connected to the network load circuit 1 in the following manner. The central station operator closes the circuit breaker 23, and the application of the high-frequency currents to the feeder circuit 6, from the high-frequency generator 18, results in the effective energization of the high-frequency relays 6—R. The existence of a potential on the network load circuit 1 provides a voltage for energizing the closing circuits associated with the network circuit breakers 6—N, and these network circuit breakers are immediately actuated to their closed positions. Inasmuch as the network load circuit voltage exists on both the network load circuit ends of the feeder circuits 2 and 6, the relay control apparatus associated with the circuit breaker 24 becomes effective to close the circuit breaker 24.

A voltage proportional to the network load circuit voltage now exists on the network transformer side of the open feeder circuit breaker 13, and the central station operator synchronizes the voltage of the source or bus 8 with this voltage and, when the two voltages bear a predetermined permissible magnitude and phase angle relation, the central station operator closes the feeder circuit breaker 13 to supply power to the network load circuit 1 through the feeder circuit 6.

When only the feeder circuits 3, 4 or 6 are connected to supply power to the network load circuit 1, the relay control operation, in the event of a fault or predetermined abnormal current condition existing on such feeder circuit, is substantially the same as that described with reference to a fault occurring on feeder circuit 2 when the network load circuit 1 was energized by only feeder circuit 2, as previously described.

However, assuming that the network load circuit 1 is energized from only the feeder circuits 3 and 4 and that a fault or predetermined abnormal current condition exists on one of these feeder circuits, the relay control apparatus associated with the high-frequency generator 32 and circuit breakers 34 and 36 becomes effective to actuate the circuit breaker 26 to its open position, and thereafter to close either the circuit breaker 34 or the circuit breaker 36 to supply high-frequency currents to the network load circuit end of the faulty feeder circuit 3 or 4. The feeder circuit breaker in the faulty feeder will be actuated to its open position after the opening of the circuit breaker 26, by means of suitable overcurrent relays, and the high-frequency generator 18 is connected to supply the other-than-normal frequency control currents to the faulty feeder circuit.

The purpose of applying the high-frequency currents from the high-frequency generator 32 to the network load circuit end of a faulty feeder circuit is to ensure that the high-frequency relays associated with the faulty feeder circuit will be effectively energized to complete the tripping circuits for their associated network circuit breakers. Obviously, this additional high-frequency source is necessitated in view of the fact that, upon the occurrence of many fault conditions which may possibly exist on the feeder circuit 3 or 4, such fault may effectively shunt most of the high-frequency currents supplied to the feeder circuit, by the high-frequency generator 18, at the source end of either feeder circuit 3 or 4.

Upon the application of the high-frequency currents to both ends of the faulty feeder circuit, the high-frequency relays associated with such feeder circuit are effectively energized to complete a tripping circuit for their associated network circuit breakers. The presence of network potential results in the actuation of such network circuit breakers to their open positions to completely isolate the faulty feeder circuit from both its associated source or bus 8 and the network load circuit 1. After a short time delay, the high-frequency generators 18 and 32 are automatically disconnected from their associated ends of the faulty feeder circuit.

When the feeder circuits 2 and 6 are both connected to supply power to the network load circuit 1 and a fault occurs on either of such feeder circuits, the circuit breaker 24 is actuated to its open position and thereafter the feeder circuit breaker in the faulty feeder circuit will be actuated to its open position by means of suitable overcurrent relays. The high frequency generator 14 or 18 is automatically connected to the faulty feeder circuit 2 or 6 and the high-frequency generator 27 is automatically connected to the network load circuit end of the faulty feeder circuit through either the circuit breakers 29 or 31, depending upon whether the feeder circuit 2 or the feeder circuit 6 is the faulty feeder circuit. The network circuit breakers associated with the faulty feeder circuit will then be actuated to their open positions in a manner similar to that described for a fault occurring on either feeder circuit 3 or 4 when such feeder circuits were connected to supply power to the network load circuit 1.

From the foregoing, it may be observed that the other-than-normal frequency control and protective means, provided for an alternating-current system of distribution, permits the connection of one or more feeder circuits, energized from the same or different sources or buses, to supply power to a common network load circuit 1, and also provides for the isolation of any faulty feeder circuit from both its bus or source end and from the network load circuit.

In the general system arrangement as shown in Fig. 1 of the drawings, it may be noted that only four feeder circuits are provided for energizing a common network load circuit, and that two loop circuits are completed by means of connecting respective network load circuit ends of different pairs of the feeder circuits. The present invention is not at all limited to any particular type of alternating-current system of distribution, and any number of feeder circuits, energized from the same or different sources or buses, may be understood as being included in a typical alternating-current system of distribution.

The only purpose of providing loop circuits between pairs of feeder circuits is to permit the use of one high-frequency generator for superimposing the other-than-normal frequency currents upon the network load circuit ends of two feeder circuits. Obviously, in the event that all of the feeder circuits may not be segregated into pairs to form loop circuits, it would be necessary to provide an additional high-frequency generator for superimposing the other-than-normal frequency currents on the network load circuit ends of such remaining feeder circuits. The present invention may also be applied to an alternating-current system of distribution, wherein separate high-frequency generators are associated with the respective network load circuit ends of the feeder circuit supplying power to a network load circuit, and under such system conditions, it would be unnecessary to provide any loop circuits between respective pairs of feeder circuits.

Figure 2:
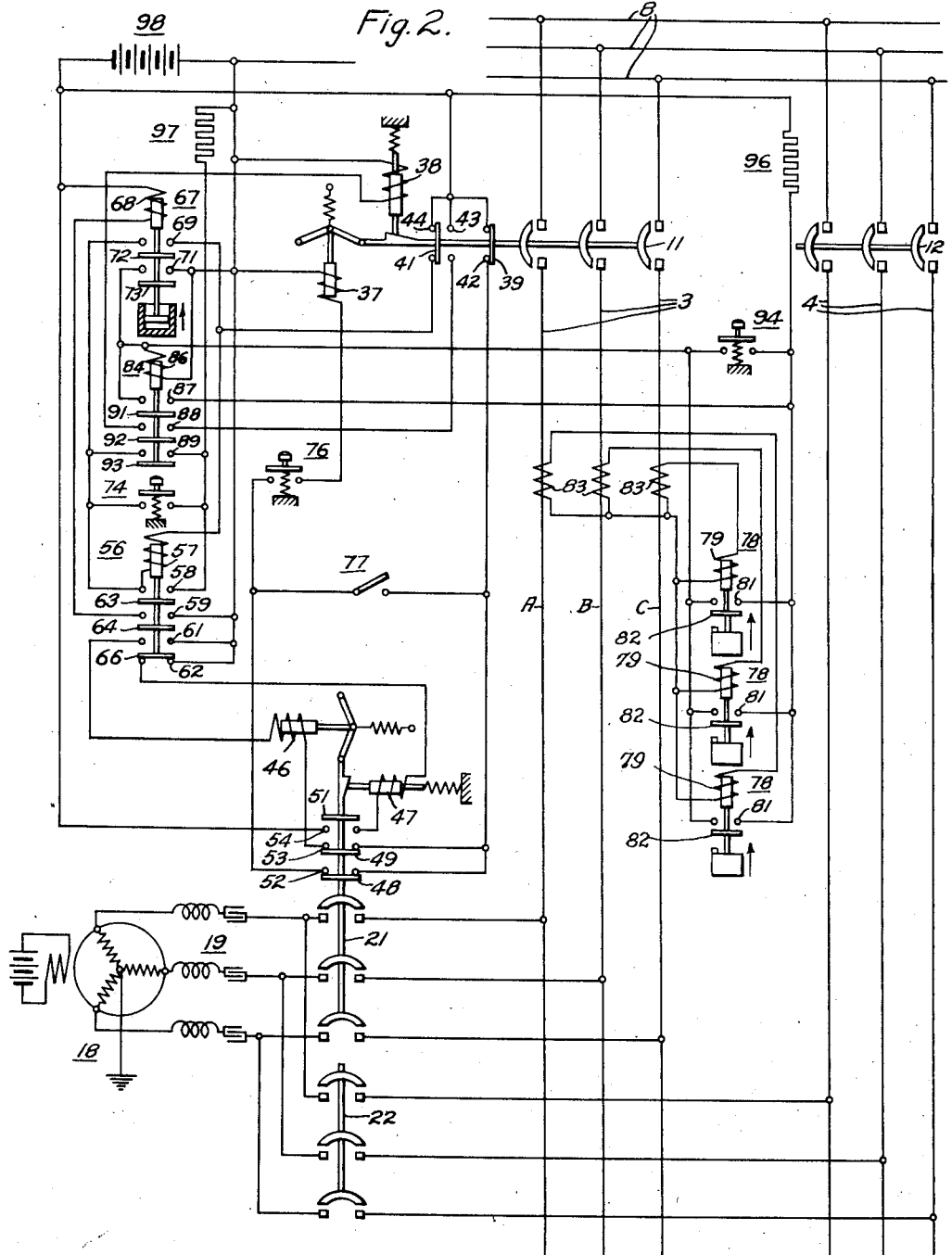
Fig. 2 is a diagrammatic illustration of the control and protective means associated with one of the feeder circuits at the source or bus.

The relay control arrangement associated with the feeder circuit breakers 9 and 11, 12, 13 and their associated high-frequency generators 14 and 18, respectively, may be exactly the same, and the relay control apparatus associated with one of such feeder circuits is indicated in Fig. 2 of the drawings.

Referring more particularly to Fig. 2 of the drawings, the relay control apparatus for one of the feeder circuit breakers and its associated high-frequency generator is illustrated as being adapted to control the connection of feeder circuit 3 to supply power to a network load circuit from a source or bus 8. The feeder circuit 3 is adapted to be connected to the source or bus 8 by means of the feeder circuit breaker 11, and the high-frequency generator 18 is adapted to be connected to supply the other-than-normal frequency currents to the feeder circuit 3 through the circuit breaker 21.

The feeder circuit breaker 11 is provided with suitable closing and tripping mechanisms, including a closing coil 37 and a tripping coil 38, respectively, pallet switches 39 and 41 and stationary contacts 42, 43 and 44. The circuit breaker 21 is provided with suitable closing and tripping mechanisms, including closing coil 46 and tripping coil 47, respectively, pallet switches 48, 49 and 51 and stationary contacts 52, 53 and 54.

An initiating relay 56 is included in the relay control arrangement, and is provided with an energizing winding 57, stationary contacts 58, 59, 61 and 62 and moving contacts 63, 64 and 66. A time-delay relay 67 is controlled by the initiating relay 56, and is provided with energizing winding 68, stationary contacts 69 and 71 and moving contacts 72 and 73.

A push button switch 74 is associated with the initiating relay 56, and is provided for the purpose of connecting the high-frequency generator 18 to the feeder circuit 3. A second push button switch 76 is associated with the closing mechanism of feeder circuit breaker 11, and is arranged to effect the closure of feeder circuit breaker 11 when the circuit breaker 21 is in its open position, and to complete an energizing circuit for the closing winding 37 of feeder circuit breaker 11 through a manually operable switch 77 when the circuit breaker 21 is in its closed position.

Three overcurrent relays 78, preferably of the induction type, although for simplicity illustrated as time-element plunger-type relays, are provided with energizing windings 79, stationary contacts 81 and moving contact 82. The energizing windings 79 are adapted to be energized in accordance with the current flowing in the respective phases A, B and C of the feeder circuit 3, and such energization is effected by means of star-connected current transformers having the secondary windings 83 thereof associated with the respective phases A, B and C.

The overcurrent relays 78 are designed to have a small time delay in bridging contacts 81 and are arranged to effect the energization of a tripping relay 84, provided with an energizing winding 86, stationary contacts 87, 88 and 89, and moving contacts 91, 92 and 93.

A third push button switch 94 is associated with the tripping relay 84, and is provided for the purpose of permitting a central station operator to actuate the feeder circuit breaker 11 to its open position for any reason whatever. A resistor 96 is included in the energizing circuit for the energizing winding 86 of tripping relay 84 for purposes to be explained hereinafter, and a second resistor 97 is also included in a normally open circuit adapted to be completed by the tripping relay 84. An independent source of power 98, indicated generically as a direct-current source or battery, is included in the relay control arrangement for providing proper potential for actuating the various relays and the energizing coils associated with the feeder circuit breaker 11 and the circuit breaker 21.

The sequence of control for connecting the feeder circuit 3 to supply power to a network load circuit may be explained as follows. The central station operator closes the push button switch 74, thereby completing an energizing circuit for the energizing winding 57 of initiating relay 56. This energizing circuit may be traced from the positive side of battery 98, resistor 97, push button switch 74, energizing winding 57 of relay 56, stationary contacts 44 and pallet switch 41 of feeder circuit breaker 11, and thence to the negative terminal of the direct-current source 98.

The energization of initiating relay 56 results in the bridging of stationary contacts 58, 59 and 61 by means of the moving contacts 63, 64 and 66, respectively. The bridging of stationary contacts 58 completes a holding circuit for the energizing winding 57 of the initiating relay 56. This holding circuit may be traced from the positive terminal of the direct-current source 98, resistor 97, stationary contacts 58 and moving contact 63 of relay 56, energizing winding 57 of relay 56, stationary contacts 44 and pallet switch 41 of feeder circuit breaker 11 and thence to the negative terminal of the direct-current source 98.

The bridging of stationary contacts 59 by the moving contact 64 completes an energizing circuit for the energizing winding 68 of the time-delay relay 67. This circuit may be traced from the positive terminal of the direct-current source 98 through stationary contacts 59 and moving contact 64 of relay 56, energizing winding 68 of the time-delay relay 67, and thence to the negative terminal of the direct-current source 98.

The bridging of stationary contacts 61 by the moving contact 66 completes an energizing circuit for the closing coil 46 associated with the circuit breaker 21. This energizing circuit may be traced from the positive terminal of the direct-current source 98 through the stationary contacts 61 and moving contact 66 of relay 56, energizing winding 46 associated with the circuit breaker 21, stationary contacts 53 and pallet switch 49 of circuit breaker 21, stationary contacts 42 and pallet switch 39 of circuit breaker 11, and thence to the positive terminal of the direct-current source 98.

The energization of the closing coil 46 results in the actuation of the circuit breaker 21 to its closed position to thereby connect the high-frequency generator 18 to the feeder circuit 3. The application of the other-than-normal frequency currents to the feeder circuit 3 results in the effective energization of the high-frequency relays associated with the network load circuit end of the feeder circuit 3.

The central station operator now manually closes the switch 77 and then closes the push button switch 76. The simultaneous closing of the switches 76 and 77 completes an energizing circuit for the closing coil 37 associated with the feeder circuit breaker 11. The energizing circuit for the closing coil 37 may thus be traced from the positive terminal of the direct-current source 98 through the energizing winding 37, push button switch 76, manually closed switch 77, stationary contacts 42 and pallet switch 39 associated with the feeder circuit breaker 11, and thence to the negative terminal of the direct-current source 98. The feeder circuit breaker 11 is thereupon actuated to its closed position to energize the feeder circuit 3 from the source or bus 8.

The energization of the feeder circuit 3 results in the energization of the network transformers associated with the feeder circuit 3, and the potential on the secondary side of such transformers is available for completing the energizing circuit for the closing mechanisms of the associated network circuit breakers. The network circuit breakers associated with the feeder circuit 3 are thereupon immediately actuated to their closed positions and latched in such positions by any suitable mechanical latching means.

The closing of the feeder circuit breaker 11 interrupted the energizing circuit for the winding 57 of initiating relay 56, inasmuch as the pallet switch 41 is moved out of engagement with the stationary contacts 44. The deenergization of relay 56 results in the bridging of stationary contacts 62 thereof by means of the moving contact 66, thus completing an energizing circuit for the tripping coil 47 associated with the circuit breaker 21. This energizing circuit may be traced from the positive terminal of the direct-current source 98 through stationary contacts 62 and moving contact 66 of relay 56, tripping coil 47, stationary contacts 54 and pallet switch 51 associated with the circuit breaker 21, and thence to the negative terminal of the direct-current source 98.

The circuit breaker 21 is thereupon actuated to its open position with the result that the high-frequency generator 18 is disconnected from the feeder circuit 3, and the high-frequency relays associated with the network load circuit ends of feeder circuit 3 are deenergized or reset for the next or tripping operation of their associated network circuit breakers.

The deenergization of initiating relay 56 also resulted in the opening of the circuit completed through the stationary contacts 59 thereof with the result that the energizing winding 68, of the time-delay relay 67, is deenergized, and relay 67 is, therefore, returned to its normal condition. One reason for providing the relay 67 with a time-delay operation is to disconnect the high-frequency generator 18 from the feeder circuit 3 in the event that the central station operator does not sequentially close the switches 77 and 76, in order to close the feeder circuit breaker 11, for any reason whatever.

Assuming now that the central station operator has closed the push button switch 74 to thereby actuate the circuit breaker 21 to its closed position, as just described, and that the feeder circuit breaker 11 is not actuated to its closed position by the sequential closure of the switches 77 and 76, the energizing winding 68, of the time-delay relay 67, is energized for a sufficiently long time to effect the bridging of the stationary contacts 69 and 71 thereof by means of the moving contacts 72 and 73, respectively. The bridging of stationary contacts 69 by means of the moving contact 72 provides a short-circuiting connection for the energizing winding 57 of initiating relay 56 with the result that the initiating relay 56 becomes deenergized and bridges the stationary contacts 62 thereof by means of the moving contact 66. The bridging of stationary contacts 62 completes an energizing circuit for the tripping coil 47 associated with the circuit breaker 21. The circuit breaker 21 is thereupon actuated to its open position to disconnect the high-frequency generator 18 from the feeder circuit 3, as previously described.

Assuming now that the feeder circuit breaker 11 has been closed to connect the feeder circuit 3 to the source or bus 8 to supply power to the network load circuit through its associated network transformers, the central station operator now opens the switch 77, and the relay control arrangement associated with the feeder circuit breaker 11 and the circuit breaker 21 is returned to its normal condition.

In the event of a fault or predetermined abnormal current condition existing on the feeder circuit 3, the winding 79 of one or more of the overcurrent relays 78 will be effectively energized to bridge one or more of the stationary contacts 81 by means of the moving contacts 82. Since the stationary contacts 81, of the overcurrent relays 78, are all connected in parallel, only one circuit is completed upon the bridging of any of such stationary contacts by means of the moving contacts 82, and this circuit may be traced from the positive terminal of the direct-current source 98, through energizing winding 86 of the tripping relay 84, stationary contacts 81 and moving contacts 82 of one or more of the overcurrent relays 78, resistor 96 and thence to the negative terminal of the direct-current source 98. The energizing winding 86, of the tripping relay 84, is thereupon effectively energized to effect the bridging of stationary contacts 87, 88 and 89 by means of the moving contacts 91, 92 and 93, respectively.

The bridging of stationary contacts 87 by means of the moving contact 91 completes a holding circuit for the energizing winding 86 of the relay 84. This holding circuit may be traced from the positive terminal of the direct-current source 98 through energizing winding 86 of relay 84, stationary contacts 87 and moving contact 91 of relay 84, resistor 96, and thence to the negative terminal of the direct-current source 98.

The bridging of stationary contacts 88 by means of the moving contact 92 completes an energizing circuit for the tripping coil 38 associated with the feeder circuit breaker 11. This energizing circuit may be traced from the positive terminal of the direct-current source 98, through tripping coil 38 associated with the feeder circuit breaker 11, stationary contacts 88 and moving contact 92 of relay 84, stationary contacts 43 and pallet switch 41 of feeder circuit breaker 11 and thence to the negative terminal of the direct-current source 98. The feeder circuit breaker 11 is thereupon actuated to its open position, and the feeder circuit 3 is disconnected from its associated source or bus 8.

The bridging of stationary contacts 89 by means of the moving contact 93 completes an energizing circuit for the energizing winding 57 of the initiating relay 56. This energizing circuit may be traced from the positive terminal of the direct-current source 98 through resistor 97, stationary contacts 89 and moving contact 93 of relay 84, energizing winding 57 of initiating relay 56, stationary contacts 44 and pallet switch 41 of feeder circuit breaker 11 and thence to the negative terminal of the direct-current source 98.

The energization of winding 57 of initiating relay 56 results in the bridging of stationary contacts 58, 59 and 61 thereof by means of the moving contacts 63, 64 and 66, respectively. The bridging of stationary contacts 58 by means of the moving contact 63 completes a holding circuit for the energizing winding 57. The bridging of stationary contacts 59 by means of the moving contact 64 completes an energizing circuit for the winding 68 of the time-delay relay 67. The bridging of stationary contacts 61 by means of the moving contact 66 completes an energizing circuit for the closing coil 46 of the circuit breaker 21.

The circuit breaker 21 is thus actuated to its closed position to connect the high-frequency generator 18 to the feeder circuit 3. The application of the other-than-normal frequency currents to the feeder circuit 3 results in the effective energization of one or more of the high-frequency relays associated with the network load circuit end of the feeder circuit 3, assuming that the fault on the feeder circuit 3 was not of such nature to completely shunt all of the other-than-normal frequency control currents, and the actuation of such high-frequency relays partially completes a tripping circuit for their associated network circuit breakers.

However, since the network load circuit was adapted to be energized from only the feeder circuit 3, and since the feeder circuit breaker 11 has been actuated to its open position in response to the fault or a predetermined abnormal current condition existing on the feeder circuit 3, no potential exists on the secondary side of the network transformers to energize the tripping circuits for the network circuit breakers, with the result that the network circuit breakers remain in their closed positions.

After a predetermined time delay, the time-delay relay 67 is effectively energized to bridge its stationary contacts 69 and 71 by means of the moving contacts 72 and 73, respectively. The bridging of stationary contacts 69 by means of the moving contact 72 provides a shunting circuit for the energizing winding 57 of the initiating relay 56 with the result that the relay 56 is deenergized and the stationary contacts 62 are bridged by the moving contact 66. The bridging of stationary contacts 62, by means of the moving contact 66, completes an energizing circuit for the tripping coil 47 associated with the circuit breaker 21. The circuit breaker 21 is thereupon actuated to its open position to disconnect the high-frequency generator from the feeder circuit 3, and the high-frequency relays, associated with the network load circuit end of the feeder circuit 3, are completely deenergized.

The bridging of stationary contacts 71, of relay 67, by means of the moving contact 73, provides a shunting circuit for the energizing winding 86 of the tripping relay 84. This shunting circuit effectively deenergizes the winding 86 of relay 84 by providing a parallel circuit from the positive terminal of the direct-current source 98 through stationary contacts 71 and moving contact 73 of relay 67, stationary contacts 87 and moving contact 91 of relay 84, resistor 96, and thence to the negative terminal of the direct-current source 98. The resistor 96 is provided in order that the shunting of the winding 86 of relay 84 will not provide a short circuit for the direct-current source 98.

Since the bridging of stationary contacts 69, of relay 67, by means of the moving contact 72, resulted in the deenergization of the winding 57 of the relay 56, the moving contact 64 of relay 56 was moved out of engagement with the stationary contacts 59, thereby opening the energizing circuit of the winding 68 of the time-delay relay 67. The shunting circuit provided by the bridging of the stationary contacts 69 of relay 67, by means of the moving contact 72, may be traced from the positive terminal of the direct-current source 98 through the resistor 97, stationary contacts 58 and moving contact 63 of the initiating relay 56, stationary contacts 69 and moving contact 72 of relay 67, stationary contacts 44 and pallet switch 41 associated with the feeder circuit breaker 11, and thence to the negative terminal of the direct-current source 98. The resistor 97 is provided for the purpose of effecting a shunting circuit for the energizing winding of the initiating relay 56 without short circuiting the direct-current source.

Assuming now that the fault condition is removed from the feeder circuit 3, and that it is again desired to connect the feeder circuit 3 to supply power to the network load circuit from the source or bus 8, it is only necessary for the central station operator to sequentially close the switches 77 and 76 to thereby complete an energizing circuit for the closing coil 37 associated with the circuit breaker 11. The energizing circuit for the closing coil 37 has been traced hereinbefore, and a repetition thereof is deemed unnecessary.

The feeder circuit breaker 11 is thereupon actuated to its closed position, and, since the network circuit breakers associated with the network load circuit end of the feeder circuit 3 have remained in their closed positions, the network load circuit is energized from the source or bus 8 by means of the feeder circuit 3. Since the network circuit breakers had not been actuated to their open position, as a result of the fault existing on the feeder circuit 3, it is unnecessary to again apply the other-than-normal frequency currents to the feeder circuit 3 for the purpose of energizing the high-frequency relays associated with the network load circuit end of the feeder circuit 3.

However, assuming that the fault has not been removed from the feeder circuit 3, and that the network load circuit has been energized by feeder circuit 4 or any other feeder circuits adapted to be connected to supply power to the network load circuits, the relay control apparatus associated with the high-frequency generator at the network load circuit end of feeder circuit 3 will respond to apply the high-frequency currents to such feeder circuit with the result that the high-frequency relays will be effectively energized and, since a network potential exists on the secondary side of the network transformers connected to the feeder circuit 3, the network circuit breakers associated with the faulty feeder circuit will be actuated to their open positions to completely isolate the feeder circuit 3 from both the source or bus 8 and the network load circuit.

In the event that the network load circuit has been energized from other feeder circuits before the faulty feeder circuit 3 has been repaired, the sequence of control for connecting the repaired feeder circuit 3 to supply power to the network load circuit is the same as that described heretofore.

Assuming now that the feeder circuit breaker 12 is in its closed position, and that the network load circuit is energized from the source or bus 8 by means of the feeder circuit 4, the sequence of control for connecting the additional feeder circuit 3 to supply power to the network load circuit may be explained as follows.

The central station operator closes the push button switch 74, thereby resulting in the energization of relays 56 and 67 and the closing of the circuit breaker 21, as previously explained. Upon the closure of the circuit breaker 21, the high-frequency generator 18 is connected to supply the other-than-normal frequency control currents to the feeder circuit 3, and the high-frequency relays associated with the network load circuit end of the feeder circuit 3 are energized to partially complete a closing circuit for their associated network circuit breakers. The network circuit breakers are thereupon actuated to their closed positions due to the presence of network potential on the secondary side of their associated network transformers.

After a predetermined time delay, the time-delay relay 67 is effectively energized with the result that the circuit breaker 21 is actuated to its open position to thereby disconnect the high-frequency generator 18 from the feeder circuit 3. The initiating relay 56 is also deenergized, and the opening of the circuit completed across the stationary contacts 59 interrupts the energizing circuit for the time-delay relay 67.

Since the feeder circuits 3 and 4 are adapted to supply power to the same network load circuit from the common source or bus 8, it is unnecessary for the central station operator to synchronize the voltage of the source or bus 8 with the voltage appearing on the network transformer side of the open feeder circuit breaker 11. The central station operator, therefore, closes the push button switch 76, thus completing an energizing circuit for the closing coil 37 associated with the feeder circuit breaker 11. The feeder circuit breaker 11 is thereupon actuated to its closed position to connect the feeder circuit 3 to supply power to the network load circuit.

It may be noted that, during this sequence of control operation, the switch 77 was maintained in its open position, and it was necessary for the time-delay relay 67 to become effectively energized and thereby effect the opening of the circuit breaker 21 before the feeder circuit breaker 11 could be actuated to its closed position by the central station operator. This arrangement is provided in order to prevent incorrect operation of the network circuit breakers in other connected feeder circuits. To accomplish this result, the high-frequency generator 18 is disconnected from the feeder circuit 3 before the central station operator can possibly close the feeder circuit breaker 11 unless, of course, the central station operator desires to connect only one feeder circuit to supply power to a deenergized network load circuit. In the latter instance, it is necessary for the central station operator to close the switch 77 before the feeder circuit breaker 11 may be actuated to its closed position, while in the former case, the circuit breaker 21 must be in its open position to bridge the stationary contacts 52 by means of the pallet switch 48.

Now, however, assuming that the network load circuit is energized from the feeder circuit 2 (in Fig. 1) and that it is desired to permit the feeder circuit 3 to supply power to the network load circuit 1, the central station operator first superimposes the other-than-normal frequency currents on the feeder circuit 3, as described hereinbefore, and the network circuit breakers associated with the feeder circuit 3 are actuated to their closed positions.

The central station operator now synchronizes the voltage of the source or bus 8 with the voltage appearing on the network transformer side of the open feeder circuit breaker 11, and as soon as the two voltages bear a predetermined permissible magnitude and phase angle relation, the operator closes the push button switch 76 to thereby effect the actuation of the feeder circuit breaker 11 to its closed position; providing, however, that the circuit breaker 21 has been actuated to its open position due to the effective energization of the time-delay relay 67.

The relay control arrangement associated with the circuit breakers 24, 29 and 31 and the high-frequency generator 27 is substantially identical with the relay control arrangement for the circuit breakers 26, 34 and 36 and the high-frequency generator 32. For purposes of describing the control arrangement of these circuit breakers, reference will be made to Fig. 3 of the drawings, wherein the relay control arrangement is shown associated with the circuit breakers 24, 29 and 31 and the high-frequency generator 27.

The circuit breaker 24 is adapted to connect the network load circuit ends of the feeder circuits 2 and 6, while the circuit breakers 29 and 31 are adapted to permit the application of the other-than-normal frequency control currents to the respective feeder circuits 2 and 6 when the circuit breakers 29 and 31 are actuated to their closed positions. The circuit breaker 24 is provided with suitable closing and opening mechanisms, including a closing winding 101 and a tripping winding 102, respectively. This circuit breaker is also provided with stationary contacts 103 and 104 and pallet switches 106 and 107.

The circuit breaker 29 is provided with suitable closing and opening mechanisms, including a closing coil 108 and a tripping coil 109, respectively, stationary contacts 111 and 112 and pallet switch 113. The circuit breaker 31 is provided with suitable closing and opening mechanisms, including a closing coil 114 and a tripping coil 116, respectively, stationary contacts 117 and 118 and pallet switch 120.

In order to provide proper relay control operation under all possible system conditions, the high-frequency generator 27 is adapted to be connected to the network load circuit ends of either feeder circuit 2 or 6 for the purpose of effecting the opening of the network circuit breakers associated with only a faulty feeder circuit.

A voltage-responsive relay 119 is arranged to be energized in accordance with the voltage existing on the feeder circuit 2, and this relay is provided with an energizing winding 121, stationary contacts 122 and moving contact 123. Two voltage-balance relays 124 and 126 are also provided for indicating the energized condition of the feeder circuits 2 and 6, and these relays are provided with an energizing winding 127, stationary contacts 128, moving contact 129 and energizing winding 131, stationary contacts 132, and moving contact 133, respectively. A fourth voltage control relay 134 is adapted to be energized upon the effective operation of the relays 119, 124 and 126. The relay 134 is provided with an energizing winding 136, stationary contacts 137 and 138, and moving contacts 139 and 141. The foregoing described relays 119, 124, 126 and 134 are arranged to control the closure of the circuit breaker 24 when the voltages of the two feeder circuits 2 and 6 bear a predetermined magnitude and phase angle relation.

In order to effect the application of the other-than-normal frequency currents to the feeder circuits 2 and 6 from the high-frequency generator 27, suitable directional relays 142 and overcurrent relays 143 are associated with the network load circuit end of feeder circuit 2 and suitable directional relays 144, and overcurrent relays 146 are associated with the network load circuit end of the feeder circuit 6.

The directional relays 142 may be of any suitable type and are illustrated generically as including C-magnet structures 147, current windings 148, voltage windings 149, disc armatures 151, spindles or shafts 152, restraining springs 153, stationary contacts 154 and moving contacts 156. All of the overcurrent relays 143 are provided with energizing windings 157, stationary contacts 158 and moving contacts 159.

The directional relays 144 associated with the network load circuit end of feeder circuit 6 may be of any suitable type and are illustrated generically as including C-magnet structures 161, current windings 162, voltage windings 163, disc armatures 164, spindles or shafts 166, restraining springs 167, stationary contacts 168, and moving contacts 169. The overcurrent relays 146 are indicated as including energizing windings 171, stationary contacts 172 and moving contacts 173.

Auxiliary relays 174, 176 and 177 are provided in conjunction with the directional relays 142 and 144 and the overcurrent relays 143 and 146 to effect the proper application of the high frequency currents to the network load circuit ends of feeder circuits 2 and 6. The relay 174 is provided with an energizing winding 178, stationary contacts 179, 181, 182, 183 and 184 and moving contacts 186, 187, 188 and 189. The relay 176 is provided with an energizing winding 191, stationary contacts 192, 193, 194, 196 and 197 and moving contacts 198, 199, 201 and 202.

The auxiliary relay 177 is operable with a time delay in bridging the contacts thereof and is designed to open the contacts substantially instantaneously upon the deenergization of the relay winding. This relay is provided with an energizing winding 203, stationary contacts 204 and 206 and moving contacts 207 and 208.

A resistor 209 is included in the energizing circuit for the winding 178 of relay 174 and a second resistor 211 is included in the energizing circuit for the energizing winding 191 of relay 176. The purpose of including resistors 209 and 211 in these energizing circuits will be explained hereinafter.

The current windings 148 of the directional relays 142 are arranged to be energized in accordance with the current flowing in the respective phases of the feeder circuit 2. This energization is obtained by providing a bank of current transformers 212 having their secondary windings star-connected and the secondary terminals thereof connected to the respective current windings 148 of the directional relays 142. The energizing windings 157 of the overcurrent relays 143 are connected in series with the respective current windings 148 of the directional relays 142.

In a similar manner, the current windings 162 of the directional relays 144 are adapted to be energized in accordance with the current flowing in the respective phases of the feeder circuit 6. This energization of the current windings 162 is obtained by providing a bank of current transformers 213 having their secondary windings star-connected and connected to the respective current windings 162. The energizing windings 171 of the overcurrent relays 146 are connected in series with the current windings 162 of the directional relays 144 in a similar manner to the connection of the current windings 148 and energizing windings 157 of the relays 142 and 143, respectively.

The voltage windings 149 of the directional relays 142 are arranged to be energized in accordance with the voltages of the respective phases of the feeder circuit 2. This energization is obtained by the use of voltage transformers 214 having their primary and secondary windings star-connected.

In a similar manner the voltage windings 163 of the directional relays 144 are arranged to be energized in accordance with the voltages of the respective phases of the feeder circuit 6 by means of the star-star-bank of voltage transformers 216.

Figure 3:
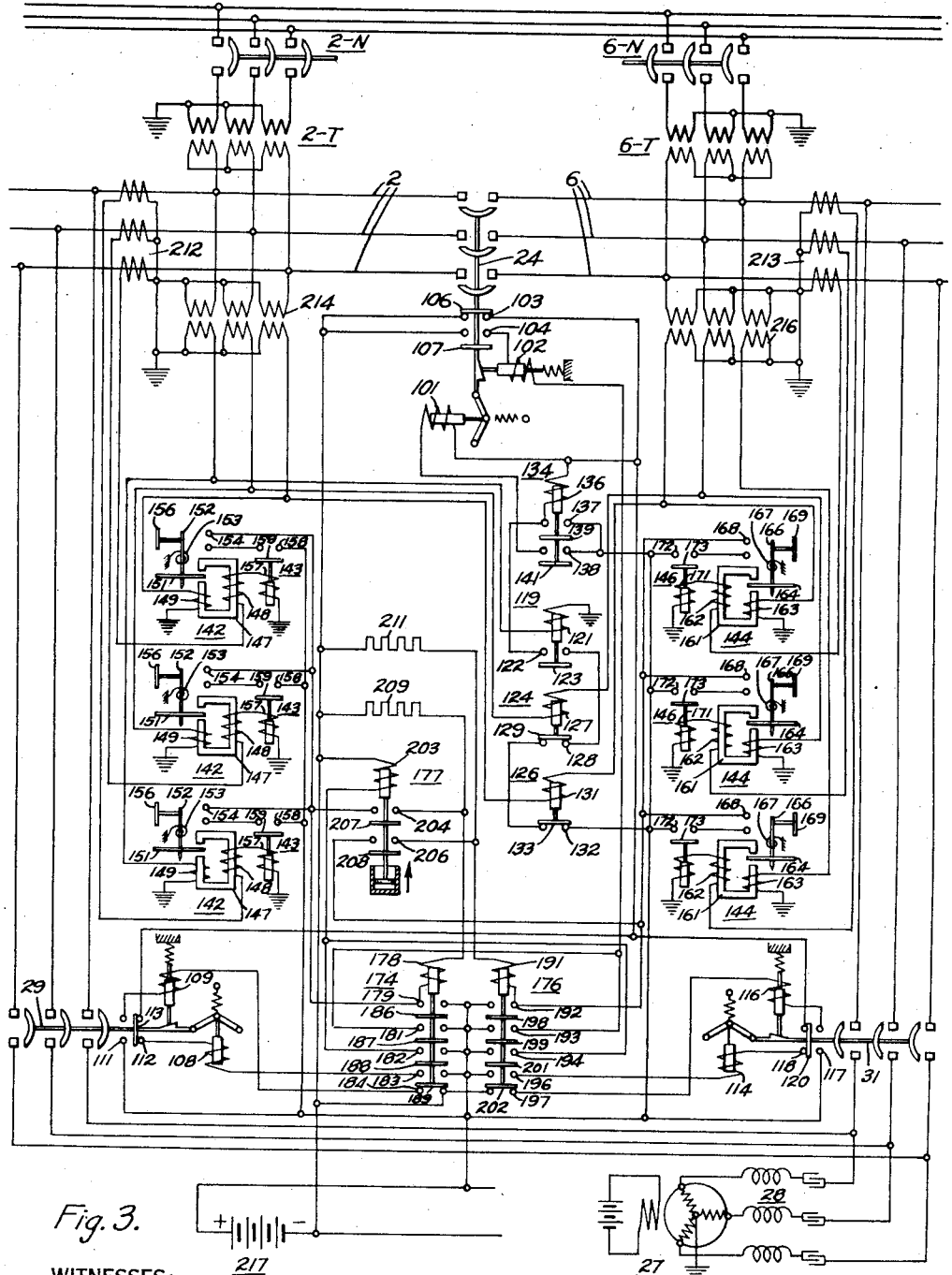
Fig. 3 is a diagrammatic illustration of the control and protective means associated with the network load circuit ends of two feeder circuits in an alternating-current system of distribution.

In the diagrammatic illustration of Figure 3, it will be noted that the current transformer banks 212 and 213 are associated with the feeder circuits 2 and 6, respectively, on the feeder or source side of the respective network transformers 2—T and 6—T. The reason for so positioning the current transformer banks 212 and 213 will be explained later.

The operation of the control apparatus associated with the circuit breakers 24, 29 and 31 is fully automatic and is of such nature as to require a minimum of inspection and maintenance. The sequence of control operation for these breakers will now be considered.

When the feeder circuit breakers associated with the feeder circuits 2 and 6 are in their open positions, the voltage relays 119, 124 and 126 will be deenergized inasmuch as the energizing voltage transformer banks 214 and 216 are completely deenergized. Under such system conditions, the voltage responsive relay 134 is deenergized and the energizing circuit for the closing coil 101 associated with the circuit breaker 24 is not completed through the stationary contacts 138 and moving contact 141 of relay 134.

Since the voltage transformer banks 214 and 216 are deenergized, the respective directional relays 142 and 144 are also deenergized and the restraining springs 153 and 167, respectively, are effective to maintain the respective moving contacts 156 and 169 out of engagement with the respective stationary contacts 154 and 168. Inasmuch as no circuit is completed through the control contacts of the respective directional relays, the circuit breakers 29 and 31 are maintained in their open positions by suitable biasing means and the high frequency generator 27 is not adapted to be connected to either of the feeder circuits 2 or 6.

Assuming, however, that the feeder circuit breaker associated with the feeder circuit 2 is actuated to its closed position by the central station operator, the voltage relay 119 is effectively energized to bridge the stationary contacts 122 thereof by means of the moving contact 123. However, since the voltage responsive relays 124 and 126 are arranged to be energized in accordance with the difference between respective phase voltages of the feeder circuits 2 and 6, the energization of only the feeder circuit 2 results in the effective energization of the windings 127 and 131 of the relays 124 and 126, respectively, and the moving contacts 129 and 133 are moved out of engagement with the respective stationary contacts 128 and 132.

Inasmuch as the voltage responsive relay 134 is only adapted to be energized when the stationary contacts 122, 128 and 132 are bridged by the respective moving contacts 123, 129 and 133, the energizing circuit for the winding 136 will be open and the closing coil 101 of the circuit breaker 24 remains deenergized.

Upon the energization of the feeder circuit 2, the control apparatus associated with the feeder circuit breaker and the network circuit breaker 2—N is responsive to actuate the circuit breaker 2—N to its closed position to thereby energize the network load circuit. Under these system conditions, that is when the network load is energized only by the feeder circuit 2, the opening of the feeder circuit breaker for any reason, as due to the occurrence of a fault on the feeder circuit 2, will not result in the opening of the network circuit breaker 2—N, there being no voltage present on the secondary side of the network transformer 2—T.

However, assuming that the network load circuit is energized from the feeder circuit 2 and also from one or more feeder circuits other than the feeder circuit 6, the opening of the feeder circuit breaker associated with the feeder circuit 2, due to the occurrence of a fault on feeder circuit 2, will result in the flow of power from the network load circuit through the network transformer 2—T to the fault.

One or more of the directional relays 142 are thereupon effectively energized to bridge one or more of the stationary contacts 154 by means of the moving contacts 156. The overcurrent relays 143 are adjusted to be effectively energized for a predetermined magnitude of current flowing in the feeder circuit 2 and, when this magnitude of current obtains in the feeder circuit 2, the stationary contacts 158 are bridged by the moving contacts 159. Inasmuch as the response setting for the overcurrent relays 143 will be such as to result in the effective energization of such relays upon the occurrence of fault conditions on the feeder circuit 2, one or more of the directional relays 142 and associated overcurrent relay 143 will bridge the stationary contacts 154 and 158 by means of the moving contacts 156 and 159, respectively.

Upon the bridging of one or more of the associated stationary contacts 154 and 158, an energizing circuit is completed for the energizing winding 178 of the auxiliary relay 174. This energizing circuit may be traced from the positive terminal of any suitable direct current source, such as battery 217, through one or more of the stationary contacts 158 and moving contacts 159 of the overcurrent relays 143, through the stationary contacts 154 and moving contacts 156 of the associated directional relay 142, energizing winding 178 of relay 174, resistor 209, and thence to the negative terminal of the direct current source 217.

The winding 178 of relay 174 is effectively energized and the stationary contacts 179 are bridged by the moving contact 186 to complete a holding circuit for the energizing winding 178. This holding circuit may be traced from the positive terminal of the direct current source 217 through the stationary contacts 179 and moving contact 186 of relay 174, energizing winding 178, resistance 209 and thence to the negative terminal of the direct current source 217.

The bridging of stationary contacts 182 by the moving contact 188 completes the energizing circuit of the time delay relay 177. This energizing circuit may be traced from the positive terminal of the direct current source 217 through the stationary contacts 182 and moving contact 188 of the relay 174, energizing winding 203 of the time delay relay 177 and thence to the negative terminal of the direct current source 217. Since the time delay relay 177 is provided with a time delay in the bridging of the stationary contacts 204 and 206 thereof, these stationary contacts are not bridged immediately.

The bridging of the stationary contacts 183 by the moving contact 189 of the relay 174 completes an energizing circuit for the closing coil 108 of the circuit breaker 29. This energizing circuit may be traced from the positive terminal of the direct current source 217 through the stationary contacts 183 and moving contact 189 of the relay 174, closing coil 108 of the circuit breaker 29, stationary contacts 112 and pallet switch 113 associated with the circuit breaker 29, stationary contacts 103 and pallet switch 106 associated with the circuit breaker 24, and thence to the negative terminal of the direct current source 217. This energizing circuit is completed through the stationary contacts 103 and the pallet switch 106, associated with the circuit breaker 24, inasmuch as the circuit breaker 24 is in its open position due to the fact that the feeder circuit 2 has been energized to supply power to the network load circuit and the feeder circuit 6 and its associated network transformers 6—T are deenergized.

The circuit breaker 29 is actuated to its closed position as a result of the effective energization of the closing coil 108, and the high frequency generator 27 is connected to supply the other-than-normal frequency control currents to the network load circuit end of the feeder circuit 2. The application of the other-than-normal frequency control currents to the network load circuit end of the feeder circuit 2 results in the relay control apparatus associated with the network circuit breakers, such as the network circuit breaker 2—N, functioning to effect the opening of only the network circuit breakers associated with the feeder circuit 2.

Upon the opening of the network circuit breakers associated with the feeder circuit 2, the faulty feeder circuit is completely isolated from both the network load circuit and from the source or bus associated with the feeder circuit 2. The function of the relay control arrangement for opening the feeder circuit breaker and thereby disconnecting the faulty feeder circuit 2 from its associated source or bus has been referred to hereinbefore and for present purposes of explanation it is only necessary to state that upon the occurrence of a fault on any feeder circuit, the feeder circuit breaker is actuated to its open position to disconnect such faulty feeder circuit from its associated source or bus.

A predetermined time delay after the energization of the time delay relay 177, the stationary contacts 204 thereof are bridged by the moving contact 207. The time delay imparted to relay 177 must be sufficient to allow for the closing of the circuit breaker 29 and the resultant opening of the network circuit breakers 2—N associated with the faulty feeder circuit 2. The bridging of the stationary contacts 204 by the moving contact 207 completes a shunting circuit for the energizing winding 178 of relay 174 with the result that the relay 174 becomes deenergized and the stationary contacts 184 thereof are bridged by the moving contact 189. The shunting circuit completed by the bridging of the stationary contacts 204 of the time delay relay 177 may be traced from the positive terminal of the direct current source 217 through the stationary contacts 179 and moving contact 186 of the relay 174, stationary contacts 204 and moving contact 207 of the time delay relay 177, resistance 209, and thence to the negative terminal of the direct current source 217.

Upon the deenergization of the relay 174 and the consequent bridging of the stationary contacts 184 of the moving contact 189, an energizing circuit for the tripping coil 109 of the circuit breaker 29 is completed. This energizing circuit may be traced from the positive terminal of the direct current source 217 through the stationary contacts 111 and pallet switch 113 associated with the circuit breaker 29, tripping coil 109, stationary contacts 184 and moving contact 189 of the relay 174, and thence to the negative terminal of the direct current source 217. The circuit breaker 29 is thereupon actuated to its open position to disconnect the high frequency generator 27 from the network load circuit end of the feeder circuit 2.

The relay control apparatus associated with the circuit breakers 24, 29 and 31 is, therefore, returned to its normal condition corresponding to the condition when both of the feeder circuits 2 and 6 are deenergized. The feeder circuit 2 may thereafter be reconnected to its associated source or bus by the central station operator when the faulty condition has been corrected and the feeder circuit may again be connected to supply power to the network load circuit through the network circuit breakers 2—N. However, assuming that the faulty condition has not been corrected and that the central station operator closes the feeder circuit breaker associated with the feeder circuit 2, the feeder circuit breaker will merely be actuated to its open position again and none of the relay control apparatus associated with the circuit breakers 24, 29 and 31 will be effective to apply the other than normal frequency control currents to the feeder circuit 2 from the high frequency generator 27.

The sequence of relay control operation is substantially the same for applying the other than normal frequency control currents to the network load circuit end of the faulty feeder circuit 6 when the feeder circuit 2 is deenergized. The only difference in the sequence of control operation is that when the network load circuit is energized from only the feeder circuit 6, the high frequency generator 27 will not be connected to the network load circuit end of the feeder circuit 6. Under system conditions when the network load circuit is energized by the feeder circuit 6 and feeder circuits or sources other than the feeder circuit 2, the directional relays 144 and overcurrent relays 146 will respond to effect the energization of the relay 176 instead of effecting the energization of the relay 174, as was the case in the system conditions just considered with respect to the faulty feeder circuit 2.

The energization of the relay 176 results in the closing of the circuit breaker 31 to thereby connect the high frequency generator 27 to the network load circuit end of the faulty feeder circuit 6 and the effective energization of the time delay relay 177 results in the deenergization of the relay 176 and the consequent opening of the circuit breaker 31 to disconnect the high frequency generator 27 from the faulty feeder circuit 6. The relay control circuits for the directional relays 144, overcurrent relays 146, relay 176 and the circuit breaker 31 are the same as the relay control arrangement for the directional relays 142, overcurrent relays 143, relay 174 and the circuit breaker 29. In order to provide for the proper deenergization of the relay 176, the time delay relay 177 is provided with a second set of stationary contacts 206 which are adapted to be bridged by the moving contact 208 to thereby provide a shunting circuit for the energizing winding 191 of the relay 176. This shunting circuit includes the second resistor 211 and the two resistors 209 and 211 are provided for the purpose of preventing a short circuit of the direct current source 217 when the time delay relay 177 is effectively energized to bridge the stationary contacts 204 or 206 thereof.

Next, assuming that the feeder circuit 2 is energized and is supplying power to the network load circuit through its associated network circuit breakers 2—N and that it is desired to connect the additional feeder circuit 6 to supply power to the network load circuit, the sequence of relay control operation for the circuit breakers 24, 29 and 31 may be explained as follows.

The central station operator applies the other-than-normal frequency control currents to the source of bus end of the feeder circuit 6 from its associated high frequency generator and, inasmuch as the network load circuit is energized from the feeder circuit 2, the network circuit breakers 6—N associated with the feeder circuit 6 are automatically actuated to their closed positions to connect the network transformers 6—T to the network load circuit. A voltage proportional to the network load circuit voltage thus appears at the network load circuit end of the feeder circuit 6 and this voltage is available for energizing the voltage transformer bank 216.

The voltage responsive relays 124 and 126 are differentially connected to respective phases of the feeder circuits 2 and 6 and, inasmuch as the voltage of the transformer bank 216 is substantially the same as the voltage of the transformer bank 214, the energizing windings 127 and 131 of the relays 124 and 126, respectively, will be deenergized and their respective stationary contacts 128 and 132 will be bridged by the moving contacts 129 and 133, respectively. Since the feeder circuit 2, and, therefore, the transformer bank 214 are energized, the voltage responsive relay 119 will be energized to bridge the stationary contacts 122 thereof by means of the moving contact 123.

The bridging of the respective stationary contacts 122, 128 and 132 of the voltage responsive relays 119, 124 and 126, respectively, results in the completion of an energizing circuit for the energizing winding 136 of the relay 134. This energizing circuit may be traced from the positive terminal of the direct current source 217 through the stationary contacts 132 and moving contact 133 of relay 126, stationary contacts 128 and moving contact 129 of the relay 124, stationary contacts 122 and moving contact 123 of the relay 119, energizing winding 136 of the relay 134, stationary contacts 103 and pallet switch 106 of the circuit breaker 24 and thence to the negative terminal of the direct current source 217.

The relay 134 is thereupon effectively energized to bridge its stationary contacts 137 and 138 by means of the moving contacts 139 and 141, respectively. The bridging of the stationary contacts 137 completes a holding circuit for the relay 134 and this holding circuit may be traced from the positive terminal of the direct current source 217 through the stationary contacts 137 and moving contact 139 of relay 134, energizing winding 136 of relay 134, stationary contacts 103 and pallet switch 106 of the circuit breaker 24, and thence to the negative terminal of the direct current source 217. It follows, therefore, that even though the central station operator manually opens the feeder circuit breaker associated with the feeder circuit 2 that the relay 134 will remain energized and the stationary contacts 138 thereof will be bridged by the moving contact 141.

The bridging of the stationary contacts 138 of relay 134 completes an energizing circuit for the closing coil 101 of the circuit breaker 24. This energizing circuit may be traced from the positive terminal of the direct current source 217 through the stationary contacts 138 and moving contact 141 of the relay 134, closing coil 101 of the circuit breaker 24, stationary contacts 103 and pallet switch 106 of the circuit breaker 24 and thence to the negative terminal of the direct current source 217. The circuit breaker 24 is thereupon actuated to its closed position and the holding circuit for the relay 134 is opened by virtue of the opening of the circuit formerly completed through the stationary contacts 103 associated with the circuit breaker 24.

The network load circuit ends of the feeder circuits 2 and 6 are, therefore, connected by means of the circuit breaker 24 and it is only necessary for the central station operator to synchronize this voltage with the voltage of the source or bus associated with the feeder circuit 6. When these two voltages bear a predetermined permissible magnitude and phase angle relationship, the central station operator closes the feeder circuit breaker associated with the feeder circuit 6 and the network load circuit is energized from both the feeder circuits 2 and 6.

The foregoing description of the sequence of relay control operation is not altered when the network load circuit is energized from feeder circuits or sources in addition to the feeder circuit 2 and it is obvious that the provision of the circuit breaker 24 merely results in the forming of a loop circuit between the feeder circuits 2 and 6.

Next, assuming that the circuit breaker 24 is in its closed position and that the feeder circuits 2 and 6 are both connected to their associated source or bus, the function of the relay control apparatus upon the occurrence of a fault on feeder circuit 6 will now be considered.

Upon the occurrence of such fault condition, power will be fed from the network load circuit to the fault. As a result of this reversal of power flow, one or more of the directional relays 144 will be effectively energized to bridge the stationary contacts 168 thereof by means of the moving contacts 169. Inasmuch as the overcurrent relays 146 are provided with a response setting such that the stationary contacts thereof are adapted to be bridged upon the occurrence of current flow in the feeder circuit 6 commensurate with the current fed to a fault, one or more of the stationary contacts 172 will be bridged by the moving contacts 173.

It follows, therefore, that upon the occurrence of a fault condition on the feeder circuit 6 that one or more of the directional relays 144 and the associated overcurrent relays 146 will be effectively energized to bridge their stationary contacts. The effective energization of one or more of the directional relays 144 and its associated overcurrent relay 146 results in the energization of the relay 176. This energizing circuit may be traced from the positive terminal of the direct current source 217 through the stationary contacts 172 and moving contacts 173 of one or more of the overcurrent relays 146, stationary contacts 168 and moving contacts 169 of the associated directional relays 144, energizing winding 191 of the relay 176, resistance 211, and thence to the negative terminal of the direct current source 217. As a result of the effective energization of the relay 176, the stationary contacts 192 thereof are bridged by the moving contact 198 to complete a holding circuit for its energizing winding 191. This holding circuit may be traced from the positive terminal of the direct current source 217 through the stationary contacts 192 and moving contact 198 of the relay 176, energizing winding 191, resistance 211 and thence to the negative terminal of the direct current source 217.

The bridging of the stationary contacts 193 by means of the moving contact 199 completes an energizing circuit for the tripping coil 102 associated with the circuit breaker 24. This energizing circuit may be traced from the positive terminal of the direct current source 217 through the stationary contacts 193 and moving contact 199 of the relay 176, tripping coil 102 of the circuit breaker 24, stationary contacts 104 and pallet switch 107 associated with the circuit breaker 24, and thence to the negative terminal of the direct current source 217. The circuit breaker 24 is thereupon actuated to its open position thereby disconnecting the network load circuit ends of the feeder circuits 2 and 6.

The feeder circuit breaker is thereafter actuated to its open position, as previously described, and the time delay imparted to the overcurrent relays associated with the feeder circuit breaker, is so determined that the circuit breaker 24 will be opened before the feeder circuit breaker opens, thereby providing for the opening of only the feeder circuit breaker included in the faulty feeder circuit.

It may be noticed that as soon as the circuit breaker 24 has been actuated to its open position, that the stationary contacts 103 thereof are bridged by the pallet switch 106 thus partially completing the energizing circuit for the winding 136 of relay 134. Due to the existence of the fault on feeder circuit 6, the difference between the voltages on the opposite sides of the circuit breaker 24 or the voltages at the respective transformer banks 214 and 216 is such that the voltage responsive relays 124 and 126 will be energized to move their contacts 129 and 133 out of engagement with the respective stationary contacts 128 and 132. This voltage difference results inasmuch as the voltage measured across the open circuit breaker 24 is equal to the impedance drop of the network load circuit. Obviously, fault current is being supplied from the feeder circuit 2 through its connected network transformers 2—T, the network load circuit and to the fault on the feeder circuit 6 through the network transformers 6—T.

The network impedance plus the impedance of transformers 2—T and 6—T in series is sufficiently high to result in a substantial voltage difference existing between the transformer banks 214 and 216 with the result that the voltage differential relays 124 and 126 are effectively energized. The existence of a substantial difference between the voltages of transformer banks 214 and 216 results irrespective of the type of network load circuit and the design of the voltage differential relays 124 and 126 may be made such that for any possible fault conditions occurring on the feeder circuits 2 and/or 6 that the circuit formerly completed through the respective stationary contacts 128 and 132 thereof and the stationary contacts 122 of relay 119 will be opened and the winding 136 of relay 134 will not be energized to effect the resultant reclosing of the circuit breaker 24.

The bridging of the stationary contacts 194 of the relay 176 by means of the moving contact 201 completes an energizing circuit for the time delay relay 177. This energizing circuit may be traced from the positive terminal of the direct current source 217 through the stationary contacts 194 and moving contact 201 of the relay 176, energizing winding 203 of the time delay relay 177, and thence to the negative terminal of the direct current source 217.

The bridging of stationary contacts 196 of the relay 176 by means of the moving contact 202 results in the completion of an energizing circuit for the closing coil 114 of the circuit breaker 31. This energizing circuit may be traced from the positive terminal of the direct current source 217 through the stationary contacts 196 and moving contact 202 of the relay 176, closing coil 114 of the circuit breaker 31, stationary contacts 118 and pallet switch 120 associated with the circuit breaker 31, stationary contacts 103 and pallet switch 106 associated with the circuit breaker 24 and thence to the negative terminal of the direct current source 217.

The circuit breaker 31 is thereupon actuated to its closed position and the high frequency generator 27 is connected to supply the other-than-normal frequency control currents to the feeder circuit 6. As explained hereinbefore, the application of the other-than-normal frequency control currents to the network load circuit end of feeder circuit 6 results in the automatic opening of the network circuit breakers 6—N thereby disconnecting the faulty feeder circuit from the network load circuit.

A predetermined time delay after the energization of the time delay relay 177, the stationary contacts 206 thereof are bridged by the moving contact 208 thereby completing a shunting circuit for the energizing winding 191 of the relay 176. This shunting circuit may be traced from the positive terminal of the direct current source 217 through the stationary contacts 192 and moving contact 198 of the relay 176, stationary contacts 206 and moving contact 208 of the time delay relay 177, resistor 211, and thence to the negative terminal of the direct current source 217. The energizing winding 191 of the relay 176 is thereupon effectively deenergized with the result that the moving contact 202 is caused to bridge the stationary contacts 197 thereby completing the tripping circuit for the circuit breaker 31. This tripping circuit may be traced from the positive terminal of the direct current source 217 through the stationary contacts 117 and pallet switch 120 associated with the circuit breaker 31, tripping coil 116, stationary contacts 197 and moving contact 202 of the relay 176 and thence to the negative terminal of the direct current source 217. The circuit breaker 31 is thereupon actuated to its open position to disconnect the high frequency generator 27 from the network load circuit end of the faulty feeder circuit 6.

Since the relay control arrangement associated with the faulty feeder circuit 6 responds to the fault condition on the feeder circuit 6 to effect the opening of the feeder circuit breaker, the faulty feeder circuit 6 is, therefore, completely isolated from both its associated source or bus and from the network load circuit. The sequence of control for effecting the reconnection of the repaired feeder circuit 6 to the network load circuit and the source or bus associated with the feeder circuit 6 has been detailed hereinbefore and it may be noted that only the relays 119, 124, 126 and 134 in the diagram of Figure 3 are energizable to complete the loop connection between the feeder circuits 2 and 6 when both of these feeder circuits are available to supply power to the network load circuit.

The respective current transformer banks 212 and 213 have been indicated as being on the source or bus side of at least one of the network transformers associated with the respective feeder circuits. The reason for so placing these current transformer banks is clearly apparent when it is realized that the control apparatus associated with the network load circuit ends of the feeder circuits 2 and 6 must respond to effect the automatic disconnection of the network circuit breakers 2—N or 6—N when the network load circuit is energized from either the feeder circuit 2 or 6 and from other feeder circuits or sources. Obviously, by placing the current transformer banks 212 and 213, as indicated, the directional relays 142 and 144 will provide a proper indication of the existence of a fault on the feeder circuits 2 or 6 because of the flow of current to the fault through either the network transformer 2—T or the network transformer 6—T.

Figure 4:
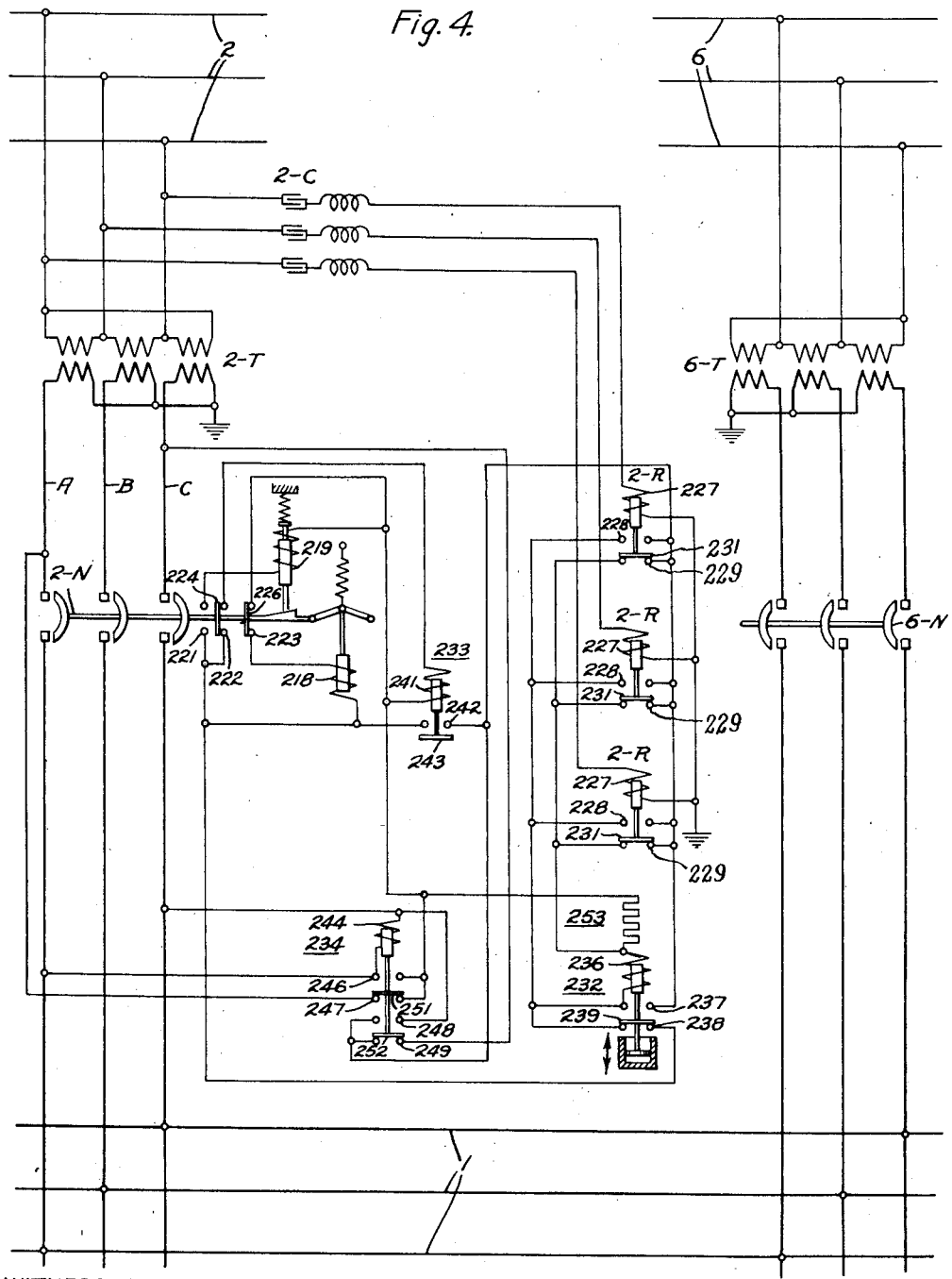
Fig. 4 is a diagrammatic illustration of the control and protective scheme associated with one of the network circuit breakers.

The sequence of relay control operation of effecting the automatic control of the network circuit breakers will now be described in detail with reference to the diagrammatic relay control arrangement illustrated in Figure 4 of the drawings. The relay control arrangement associated with each of the network transformers and associated network circuit breaker is identical and the control arrangement associated with only one network transformer 2—T and its associated network circuit breaker 2—N is illustrated in Figure 4 for purposes of explanation.

In this figure the network load circuit 1 is indicated as being adapted to be supplied with power from the feeder circuits 2 and 6 through the network transformers 2—T and 6—T and their respective associated network circuit breakers 2—N and 6—N.

The network circuit breaker 2-N is provided with suitable closing and tripping mechanisms including the closing coil 218 and the tripping coil 219, respectively. The circuit breaker 2-N is also provided with stationary contacts 221, 222 and 223 and pallet switches 224 and 226.

The high frequency relays 2—R are provided with energizing windings 227, stationary contacts 228 and 229 and moving contacts 231. The relay control arrangement also includes a time delay relay 232, a voltage responsive relay 233 and a voltage transfer relay 234. The time delay relay 232 is provided with an energizing winding 236, stationary contacts 237 and 238 and moving contact 239. The voltage responsive relay 233 is provided with an energizing winding 241, stationary contacts 242 and moving contact 243. The voltage transfer relay 234 is provided with an energizing winding 244, stationary contacts 246, 247, 248 and 249 and moving contacts 251 and 252.

Assuming that the network load circuit 1 is completely deenergized and that the central station operator desires to connect the feeder circuit 2 to supply power to the network load circuit 1, the sequence of control is as follows. The central station operator applies the other-than-normal frequency control currents to the source or bus end of the feeder circuit 2 with the result that the high frequency relays 2—R are effectively energized through the tuned circuit 2—C to bridge their respective stationary contacts 228 by means of the moving contacts 231. The energizing circuits for the time delay relay 232 and the voltage responsive relay 233 are thereby partially completed.

The partially completed energizing circuit for the time delay relay 232 may be traced from phase A on the network transformer side of the open network circuit breaker 2—N through the stationary contacts 247 and moving contact 251 of the voltage transfer relay 234, resistor 253, energizing winding 236 of relay 232, one or more of the stationary contacts 228 and moving contacts 231 of the high frequency relays 2—R, stationary contacts 249 and moving contact 252 of the voltage transfer relay 234 and thence to phase C on the network transformer side of the open network circuit breaker 2—N. However, since the network transformer 2—T is deenergized, there is no potential across the phase A—C for energizing the winding 236 of the time delay relay 232 and this relay is not energized.

The partially completed energizing circuit for the voltage responsive relay 233 may be traced from phase A on the network transformer side of the open network circuit breaker 2—N through the stationary contacts 247 and moving contact 251 of the voltage transfer relay 234, energizing winding 241 of the voltage responsive relay 233, stationary contacts 222 and pallet switch 224 associated with the network circuit breaker 2—N, stationary contacts 238 and moving contact 239 associated with the time delay relay 232, one or more of the stationary contacts 228 and the moving contacts 231 of the high frequency relays 2—R, stationary contacts 249 and moving contact 252 of the voltage transfer relay 234, and thence to phase C on the network transformer side of the open network circuit breaker 2—N. The energizing winding 241 of the voltage responsive relay 233 is also deenergized due to the absence of potential on the secondary side of the network transformer 2—T.

As previously explained with reference to Figure 2 of the drawings, the central station operator closes the feeder circuit breaker associated with the feeder circuit 2 before the other-than-normal frequency currents are removed from the feeder circuit with the result that the network transformer 2—T becomes energized. The energization of the network transformer 2—T provides a secondary potential and a voltage across the phase A—C is present for energizing the winding 241 of the voltage responsive relay 233 and the winding 236 of the time delay relay 232.

Upon the energization of the network transformer 2—T, the voltage responsive relay 233 is effectively energized to bridge the stationary contacts 242 by means of the moving contact 243. This completes a holding circuit for the energizing winding 241 of the voltage responsive relay 233 and also completes an energizing circuit for the closing coil 218 of the network circuit breaker 2—N. The holding circuit for the voltage responsive relay 233 may be traced from phase A on the network transformer side of the open network circuit breaker 2—N through the stationary contacts 247 and moving contact 251 of the voltage transfer relay 234, energizing winding 241 of the voltage responsive relay 233, stationary contacts 222 and pallet switch 224 associated with the network circuit breaker 2—N, stationary contacts 242 and moving contact 243 of the voltage responsive relay 233, stationary contacts 249 and moving contact 252 of the voltage transfer relay 234 and thence to phase C on the network transformer side of the network circuit breaker 2—N.

The energizing circuit for the closing coil 218 may be traced from phase A on the network transformer side of the open network circuit breaker 2—N through the stationary contacts 247 and moving contact 251 of the voltage transfer relay 234, stationary contacts 223 and pallet switch 226 associated with the network circuit breaker 2—N, closing coil 218, stationary contacts 242 and moving contact 243 of the voltage responsive relay 233, stationary contacts 249 and moving contact 252 of the voltage transfer relay 234, and thence to phase C on the network transformer side of the open network circuit breaker 2—N. The network circuit breaker 2—N is thereupon actuated to its closed position to connect the feeder circuit 2 to supply power to the network load circuit 1 through the network transformer 2—T.

Immediately upon the closure of the network circuit breaker 2—N, the voltage transfer relay 234 has the energizing winding 244 thereof connected across the phase A—C on the network load circuit side of the network circuit breaker 2—N and the stationary contacts 246 and 248 thereof are bridged by the respective moving contacts 251 and 252. The provision of this voltage transfer relay 234 merely transfers the energizing connections for the time delay relay 232 from the network transformer side of the network circuit breaker 2—N to the network load circuit side of the network circuit breaker 2—N. This voltage transfer relay is necessary when the network load circuit 1 is energized, since it provides the network potential for closing the network circuit breaker and thereafter allowing the central station operator to synchronize the voltage of the incoming source or bus network voltage appearing on the feeder circuit to be connected.

The relay 233 operates substantially instantaneously while the time delay relay is imparted with a predetermined time delay of operation in opening and closing its stationary contacts 238. The time delay in opening must be long enough to insure the effective energization of the voltage responsive relay 233 and the completion of its holding circuit through stationary contacts 242 and moving contact 243. This time delay is necessary because the energizing circuit for relay 233 is completed through stationary contacts 238 and moving contact 239 of the time-delay relay 232.

This time delay in opening the stationary contacts 238 of relay 232 must also be short enough to prevent the completion of the tripping circuit of the network circuit breaker 2—N. It will be noted that the energizing circuit for the tripping coil 219 is also completed through the stationary contacts 238 and moving contact 239 of the relay 232. In other words, the contacts 238 of relay 232 must be opened before the network circuit breaker 2—N has been fully actuated to its closed position to complete the tripping circuit of coil 219 through stationary contacts 221 and pallet switch 224 of the breaker 2—N. This particular time delay avoids any possibility of successive closing and opening or "pumping" of the network circuit breaker 2—N.

The time-delay in reclosing the stationary contacts 238 of the relay 232 must be sufficient to allow the voltage-transfer relay 234 to operate and shift the voltage energizing connections from the network transformer side of the network circuit breaker 2—N to the network load circuit side of the network circuit breaker 2—N. While the transfer of connections is being made by the voltage-transfer relay, the energizing circuit for the winding 236 of relay 232 is opened; however, upon the completion of the transfer, the winding 236 is again energized and the stationary contacts 238 are not closed to complete the tripping circuit for the network circuit breaker 2—N while the high frequency relays 2—R remain energized to partially complete the tripping circuit through their stationary contacts 228.

The relay control arrangement associated with the other-than-normal frequency current source at the source or bus end of the feeder circuit 2 is effective to disconnect such other-than-normal frequency source from the feeder circuit 2 after a predetermined time interval, as explained with reference to Figure 2 of the drawings. The removal of such other-than-normal frequency control currents results in the deenergization of the high frequency relays 2—R, thereby bridging the stationary contacts 229 thereof by means of the moving contacts 231. Since the stationary contacts 229 of the high frequency relays 2—R are now bridged and since the stationary contacts 237 of the time delay relay 232 are also bridged by means of the moving contact 239, a shunting circuit for the energizing winding 236 of the time delay relay 232 is thus completed.

This shunting circuit for the energizing winding 236 results in the deenergization of the time delay relay 232 and causes the stationary contacts 238 thereof to be bridged by the moving contact 239. This shunting circuit may be traced from phase A on the network load circuit side of the network circuit breaker 2—N through the stationary contacts 246 and moving contact 251 of the voltage transfer relay 234, resistor 253, stationary contacts 229 and moving contacts 231 of one or more of the high frequency relays 2—R, stationary contacts 248 and moving contact 252 of the voltage transfer relay 234, and thence to phase C on the network load circuit side of the network circuit breaker 2—N.

The relay control apparatus associated with the network transformer 2—T and the network circuit breaker 2—N, is, therefore, returned to its original condition and is in condition to effect the opening of the network circuit breaker 2—N under certain system conditions, as will be explained hereinafter.

Assuming next that the feeder circuit 2 is deenergized, the network circuit breaker 2—N in its open position and that the network load circuit 1 is energized from the feeder circuit 6 through the network transformer 6—T and its associated network circuit breaker 6—N, the sequence of control operation for connecting the feeder circuit 2 to supply power to the network load circuit 1 will now be explained.

The central station operator connects the high frequency generator to the bus or source end of the feeder circuit 2 thereby applying the other-than-normal frequency control currents to the feeder circuit 2. The high frequency relays 2—R are effectively energized to bridge their respective stationary contacts 228 by means of the moving contacts 231.

Inasmuch as the network load circuit 1 is energized, the winding 244 of the voltage transfer relay 234 is energized and the stationary contacts 246 and 248 are bridged by the respective moving contacts 251 and 252. An energizing circuit is, therefore, completed for the energizing winding 241 of the voltage responsive relay 233. This energizing circuit may be traced from phase A on the network load circuit side of the network circuit breaker 2—N through the stationary contacts 246 and moving contact 251 of the voltage transfer relay 234, energizing winding 241 of the voltage responsive relay 233, stationary contacts 222 and pallet switch 224 associated with the network circuit breaker 2—N, stationary contacts 238 and moving contact 239 of the time delay relay 232, stationary contacts 228 and moving contacts 231 of one or more of the high frequency relays 2—R, stationary contacts 248 and moving contact 252 of the voltage transfer relay 234, and thence to phase C on the network load circuit side of the network circuit breaker 2—N.

The energizing winding 236 of the time delay relay 232 is energized at the same time as the energization of the winding 241 of the voltage responsive relay 233 and the energizing circuit for the time delay relay 232 may be traced from phase A on the network load circuit side of the network circuit breaker 2—N through the stationary contacts 246 and moving contact 251 of the voltage transfer relay 234, resistor 253, energizing winding 236, stationary contacts 228 and moving contacts 231 of one or more of the high-frequency relays 2—R, stationary contacts 248 and moving contact 252 of the voltage transfer relay 234, and thence to phase C on the network load circuit side of the network circuit breaker 2—N.

Immediately upon the energization of the voltage responsive relay 233, the stationary contacts 242 thereof are bridged by the moving contact 243 to thereby complete a holding circuit for the relay 233 and also to complete an energizing circuit for the closing coil 218 of the network circuit breaker 2—N. The holding circuit may be traced from phase A on the network load circuit side of the network circuit breaker 2—N through the stationary contacts 246 and moving contact 251 of the voltage transfer relay 234, energizing winding 241 of the voltage responsive relay 233, stationary contacts 222 and pallet switch 224 associated with the network circuit breaker 2—N, stationary contacts 242 and moving contact 243 of the voltage responsive relay 233, stationary contacts 248 and moving contact 252 of the voltage transfer relay 234, and thence to phase C on the network load circuit side of the network circuit breaker 2—N.

The energizing circuit for the closing coil 218 may be traced from phase A on the network load circuit side of the network circuit breaker 2—N through the stationary contacts 246 and moving contact 251 of the voltage transfer relay 234, stationary contacts 223 and pallet switch 226 associated with the network circuit breaker 2—N, closing coil 218, stationary contacts 242 and moving contact 243 of the voltage responsive relay 233, stationary contacts 248 and moving contact 252 of the voltage transfer relay 254 and thence to phase C on the network load circuit side of the network circuit breaker 2—N.

The network circuit breaker 2—N is thereupon actuated to its closed position thereby deenergizing the closing coil 218 and the voltage responsive relay 233.

The time delay relay 232 is effectively energized during the closing operation of the network circuit breaker 2—N to bridge the stationary contacts 237. However, since the high frequency relays 2—R are still in their energized condition, the shunting circuit for the time delay relay 232 through the resistor 253 is incomplete and the time delay relay 232 remains in its actuated position. The high frequency generator associated with the source or bus end of the feeder circuit 2 is disconnected therefrom within a predetermined time interval after its original connection thereto and the high frequency relays 2—R are deenergized and bridge their respective stationary contacts 229.

The shunting circuit for the time delay relay 232 is now completed and the moving contact 239 thereof bridges the stationary contacts 238, as previously explained. The relay control apparatus associated with the network circuit breaker 2—N is, therefore, returned to its original condition and is ready to effect the opening of the network circuit breaker 2—N under certain system conditions. The feeder circuit breaker in feeder circuit 2 is then closed by the central station operator when the voltage of the source or bus is synchronized with the voltage of feeder circuit 2.

Assuming next that the network load circuit 1 is energized from only the feeder circuit 2 through the network transformers 2—T and their associated network circuit breakers 2—N, the occurrence of a fault on the feeder circuit 2 does not result in the opening of the network circuit breaker 2—N. The only resulting change in the energization of the relay control apparatus is the deenergization of the voltage transfer relay 234. Even though one or more of the high frequency relays 2—R are effectively energized to bridge their stationary contacts 228 due to the connection of the high frequency generator to the source or bus end of the faulty feeder circuit 2, the absence of potential on the secondary side of the network transformer 2—T precludes any further relay energization.

However, assuming that the network load circuit 1 is energized from both the feeder circuits 2 and 6 through their associated network transformers 2—T and 6—T, respectively, the occurrence of a fault on the feeder circuit 2 results in the application of the other-than-normal frequency control currents to both the source or bus end of the feeder circuit 2 and also to the network load circuit end of the feeder circuit 2. In this manner the high frequency relays 2—R are necessarily effectively energized to bridge their respective stationary contacts 228 and the presence of potential on the network load circuit provides a proper voltage for effecting the actuation of the network circuit breaker 2—N to its open position.

After the high frequency relays 2—R have become effectively energized, parallel energizing circuits for the tripping coil 219 of the network circuit breaker 2—N and the energizing winding 236 of the time delay relay 232 are completed. The energizing circuit for the tripping coil 219 may be traced from phase A on the network load circuit side of the network circuit breaker 2—N through the stationary contacts 246 and moving contact 251 of the voltage transfer relay 234, tripping coil 219, stationary contacts 221 and pallet switch 224 associated with the network circuit breaker 2—N, stationary contacts 238 and moving contact 239 of the time delay relay 232, stationary contacts 228 and moving contacts 231 of one or more of the high frequency relays 2—R, stationary contacts 248 and moving contact 252 of the voltage transfer relay 234, and thence to phase C on the network load circuit side of the network circuit breaker 2—N. The network circuit breaker 2—N is thereupon actuated to its open position to disconnect the network transformer 2—T and its associated feeder circuit 2 from the network load circuit 1.

The time delay relay 232 must be so adjusted that the moving contact 239 thereof is moved out of engagement with the stationary contacts 238 before the network circuit breaker 2—N has been fully actuated to its open position. This small time delay is necessary in order to prevent the voltage responsive relay 233 from becoming energized and completing the energizing circuit for the closing coil 218 of the network circuit breaker 2—N. It is clearly apparent, therefore, that the choice of this small time delay eliminates any possibility of the repeated opening and closing of the network circuit breaker 2—N. The time delay relay 232 is thereafter deenergized due to the disconnection of the high frequency source from the network load circuit end of the feeder circuit 2, as described with reference to Figure 3 of the drawings.

The feeder circuit 2 is, therefore, completely disconnected from the network load circuit 1 in the event of fault conditions occurring on the feeder circuit 2. In the explanation with reference to Figure 2 of the drawings, it was noted that the feeder circuit breaker would also be actuated to its open position in the event of a fault on the feeder circuit 2 and it follows, therefore, that the faulty feeder circuit 2 is completely isolated from both its associated source or bus and the network load circuit 1.

The only other instance when the relay control apparatus associated with the network circuit breaker 2—N may be effective to actuate the network circuit breaker 2—N to its open position is when the network load circuit 1 is energized from some other feeder circuits or sources and for some reason or other the central station operator desires to disconnect the feeder circuit 2 from the network load circuit 1. To accomplish this disconnection, the central station operator manually opens the feeder circuit breaker in the feeder circuit 2 and as a result of such feeder circuit breaker operation, the high frequency generator is connected to the source or bus end of the feeder circuit 2 and the high frequency relays 2—R are effectively energized to bridge their stationary contacts 228 with the resulting relay operation to effect the opening of the network circuit breaker 2—N. The relay operation in the event of the energization of the high frequency relays 2—R has just been detailed with reference to the occurrence of a fault condition on the feeder circuit 2 and such relay operation is the same in both instances.

When the central station operator manually opens the feeder circuit breaker in the feeder circuit 2, the high frequency generator associated with the network load circuit end of the feeder circuit 2 is not connected to the feeder circuit because the current which flows from the network load circuit 1 to the feeder circuit 2 is only sufficient to supply the magnetizing current for the network transformers 2—T and the charging current of the feeder circuit cable. As pointed out with reference to the relay control arrangement of Figure 3 of the drawings, the overcurrent relays 143 do not respond to such small magnitudes of current and none of the relays associated with the circuit breakers 24, 29 and 31 in the Figure 3 diagram are energized to effect the actuation of these circuit breakers.

As mentioned hereinbefore, the relay control arrangement for the network circuit breakers has been illustrated only in connection with one of the network circuit breakers 2—N and it should be noted that the same arrangement may be utilized in conjunction with all of the network circuit breakers. It is clearly apparent from the foregoing description of the present invention that a novel control and protective means has been provided for an alternating current network system of distribution and the control arrangement is so connected and arranged that proper control is provided for any possible system conditions without any of the attendant disadvantages which attend the use of a number of known types of control and protective systems.

Because of the novel control and protective arrangement included in the present invention and furthermore because of the distinctively different mode and sequence of control provided thereby, the present invention should not be restricted other than as indicated in the appended claims.

I claim as my invention:

1. An alternating current network system of distribution comprising a network load circuit, a plurality of feeders for supplying power to said network circuit, a plurality of transformers connecting each of said feeders to said network circuit, a plurality of network switches interposed between said transformers and said network circuit, means operable when one of said feeders is disconnected from said network circuit for superimposing other-than-normal frequency control currents on the disconnected feeder, and means effective if said network circuit is energized for causing the closure of the network switches between the deenergized feeder and said network circuit in response to said control currents.

2. An alternating current network system of distribution comprising a network load circuit, a plurality of feeders including a selected feeder for supplying power to said network circuit, a plurality of transformers connecting each of said feeders to said network circuit, a plurality of network switches interposed between said transformers and said network circuit, means for superimposing other-than-normal frequency control currents on said selected feeder, and control means for each of the network switches associated with said selected feeder, each of said control means including electromagnetic closing means energized by normal frequency power from the network side of the corresponding network switch and means responsive to said other-than-normal frequency currents for controlling said closing means.

3. In a network protector for controlling the connection of an alternating-current feeder circuit and an alternating current network load circuit, a network circuit breaker, an electromagnetic closing device for said circuit breaker, a closing circuit for energizing said closing device from said network load circuit, and control means for said closing device including a circuit-making device in said closing circuit and means energized from said feeder circuit in accordance with other-than-normal frequency control currents for controlling said circuit making device.

4. In a network protector for controlling the connection of an alternating-current feeder circuit and an alternating current network load circuit, a network circuit breaker, an electromagnetic closing device for said circuit breaker, a closing circuit for energizing said closing device, transfer means for selectively energizing said closing circuit from said network circuit or said feeder circuit depending upon conditions of energization, and control means energized from said feeder circuit in accordance with other-than-normal frequency control currents for controlling said closing circuit.

5. In an alternating current system of distribution, a normal-frequency source, a load circuit, a feeder circuit for supplying power from said source to said load circuit, a plurality of transformers connecting said feeder circuit to said load circuit, a feeder circuit breaker in said feeder circuit adjacent the source end thereof, a plurality of switches interposed between said transformers and said load circuit each of said switches having an electromagnetic tripping device, carrier means effective when said feeder breaker is open for supplying other-than-normal frequency currents to said feeder circuit adjacent said feeder circuit breaker, carrier means responsive to a fault on said feeder circuit for supplying other-than-normal frequency currents to said feeder circuit adjacent said switches, and control means for said switches, each of said control means including means responsive to said other-than-normal frequency control currents supplied by either of said carrier means for connecting the corresponding tripping device to an energized one of said circuits whereby said switches may be opened in response to a feeder fault which completely interrupts said feeder.

6. In an alternating current network system of distribution, a normal-frequency supply bus, a network load circuit, a plurality of feeders for supplying power from said bus to said load circuit, a plurality of transformers connecting said feeders to said load circuit, a feeder circuit breaker in each of said feeders adjacent said bus, a plurality of network switches interposed between said transformers and said load circuit, a source of other-than-normal frequency control currents adjacent said bus, control means for each of said network switches, each of said control means including means responsive to said other-than-normal frequency control currents for causing the corresponding network switch to open, fault-responsive opening means for each of said feeder breakers, and means responsive to the opening of any of said feeder breakers for connecting said last-mentioned source to the corresponding one of said feeders.

7. In an alternating current network system of distribution, a network load circuit, a power fequency source, a feeder for supplying power from said source to said network circuit, a plurality of transformers connecting said feeder to said network circuit, a plurality of network switches interposed between said transformers and said network circuit, means for superimposing other-than-normal frequency control currents on said feeder, and control means for each of said network switches, each of said control means including means for causing the corresponding switch to close when said feeder is deenergized with reference to power frequency currents and is in a predetermined condition of energization with reference to said control currents and said network circuit is energized with power frequency currents.

8. In an alternating current network system of distribution, a network load circuit, a power frequency source, a feeder for supplying power from said source to said network circuit, a plurality of transformers connecting said feeder to said network circuit, a plurality of network switches interposed between said transformers and said network circuit, means for superimposing other-than-normal frequency control currents on said feeder, and control means for each of said network switches, each of said control means including means for causing the corresponding switch to close when said feeder is deenergized with reference to power frequency currents and is in a predetermined condition of energization with reference to said control currents and said network circuit is energized with power frequency currents, and also when said feeder is energized with power frequency currents and is in said predetermined condition of energization with reference to said control currents.

9. In an alternating current network system of distribution, a network load circuit, a power frequency source, a feeder for supplying power from said source to said network circuit, a plurality of transformers connecting said feeder to said network circuit, a plurality of network switches interposed between said transformers and said network circuit, means for superimposing other-than-normal frequency control currents on said feeder, and control means for each of said network switches, each of said control means including means for causing the corresponding switch to close when said feeder is deenergized with reference to power frequency currents and is in a predetermined condition of energization with reference to said control currents and said network circuit is energized with power frequency currents, and also when both said feeder and said network circuit are energized with power frequency currents and said feeder is in said predetermined condition of energization with reference to said control currents.

10. In an alternating current network system of distribution, a network load circuit, a power frequency source, a feeder for supplying power from said source to said network circuit, a plurality of transformers connecting said feeder to said network circuit, a plurality of network switches interposed between said transformers and said network circuit, means for superimposing other-than-normal frequency control currents on said feeder, and control means for each of said network switches, each of said control means including means for causing the corresponding switch to close when said feeder is deenergized with reference to power frequency currents and is energized with said control currents and said network circuit is energized with power frequency currents.

11. In an alternating current network system of distribution, a network load circuit, a power frequency source, a feeder for supplying power from said source to said network circuit, a plurality of transformers connecting said feeder to said network circuit, a plurality of network switches interposed between said transformers and said network circuit, means for superimposing other-than-normal frequency control currents on said feeder, and control means for each of said network switches, each of said control means including means for causing the corresponding switch to close when said feeder is deenergized with reference to power frequency currents and is energized with said control currents and said network circuit is energized with power frequency currents, and also when said feeder is energized with power frequency currents and said control currents.

12. In an alternating current network system of distribution having a network load circuit, a feeder circuit for supplying power to said network load circuit and a plurality of network switches for controlling the connection of said feeder circuit and said network load circuit, each of said network switches having electromagnetic closing means and electromagnetic opening means, the combination comprising carrier means for superimposing other-than-normal frequency currents upon one of said circuits, and control means responsive to said currents for controlling each of said network switches, each of said control means being effective when the corresponding network switch is open to effect connection of the corresponding closing means to an adjacent one of said circuits in response to energization of said carrier means and being effective when the corresponding network switch is closed to effect connection of the corresponding opening means to an adjacent one of said circuits in response to energization of said carrier means.

13. In an alternating current network system of distribution having a network load circuit, a plurality of feeder circuits for supplying power to said network circuit, a plurality of transformers connecting each of said feeder circuits to said network circuit and network switches interposed between said transformers and said network circuit, each of said network switches having electromagnetic closing means and electromagnetic opening means, the combination comprising a source of higher-than-normal frequency currents, a plurality of circuit interrupters corresponding to said feeder circuits for controlling the flow of said currents from said source to said feeder circuits, each of said interrupters being operable to open and closed positions, and control means responsive to said currents for controlling each of said network switches, each of said control means being effective when the corresponding network switch is open to effect connection of the corresponding closing means to an adjacent one of said circuits in response to a predetermined position of the corresponding interrupter and being effective when the corresponding network switch is closed to effect connection of the corresponding opening means to an adjacent one of said circuits in response to a predetermined position of the corresponding interrupter.

14. In an alternating current network system of distribution having a network load circuit, a plurality of feeder circuits for supplying power to said network load circuit, a feeder circuit breaker in each of said feeder circuits, a plurality of transformers connecting each of said feeder circuits to said network load circuit and network switches interposed between said transformers and said network load circuit, each of said network switches having an electromagnetic tripping device, the combination comprising responsive to a fault on any of said feeder circuits for superimposing currents of higher-than-normal frequency on the faulted feeder circuit, means responsive to the opening of any of said feeder breakers for superimposing currents of higher-than-normal frequency on the corresponding feeder circuit, and control means for each of said network switches, each of said control means including means responsive to said currents of higher-than-normal frequency supplied by either of said means for connecting the corresponding tripping device to an adjacent one of said circuits, whereby said switches are opened in response to the opening of the corresponding feeder breaker and also in response to feeder faults regardless of the open or closed condition of the corresponding feeder breaker if said adjacent one of said circuits is energized.

15. In an alternating current network system of distribution having a network load circuit, a plurality of feeders including a selected feeder for supplying power to said network circuit and a plurality of network switches for controlling the connection of said selected feeder and said network circuit, the combination comprising means for superimposing other-than-normal frequency currents upon said selected feeder, and control means responsive to said currents for controlling each of said network switches, each of said control means being effective when the corresponding network switch is open to cause closure thereof in response to said currents, by means of normal frequency power supplied by said network circuit if said network circuit is energized, and by means of normal frequency power supplied by said selected feeder if said network circuit is deenergized.

16. In an alternating current network system of distribution having a network load circuit, a feeder circuit for supplying power to said network load circuit and a plurality of network switches for controlling the connection of said feeder circuit and said network load circuit, each of said network switches having an electromagnetic tripping device, the combination comprising means operable from the source end of said feeder circuit for superimposing other-than-normal frequency currents upon said feeder circuit, means responsive to a fault on said feeder circuit for superimposing other-than-normal frequency currents thereupon, and control means for each of said network switches, each of said control means including means responsive to said other-than-normal frequency currents for connecting the corresponding tripping device to an adjacent one of said circuits.

17. In an alternating-current system of distribution including a supply circuit, a circuit breaker in said supply circuit, a network load circuit, and a network switch connecting said circuits, said network switch having an electromagnetic closing device, the combination including a source of other-than-normal frequency currents, a circuit interrupter connecting said source with said supply circuit, means responsive to the source currents and arranged to control the connection of said closing device to an adjacent one of said circuits, means for closing the said circuit interrupter and means controlled by said circuit breaker for opening said circuit interrupter when said circuit breaker closes.

18. In an alternating-current system of distribution including a plurality of supply sources, one or more feeder circuits energized by each of said supply sources, a circuit breaker connecting each feeder circuit with its associated supply source, a common network load circuit and a network switch connecting each of said feeder circuits with said network load circuit, the combination including source means of other-than-normal frequency currents, circuit interrupter means connecting said source means to each of said feeder circuits, means responsive to predetermined energized conditions of two of said feeder circuits for connecting the network load circuit ends of said two feeder circuits to form a loop feeder circuit, and control means for said network switches including means responsive to said other-than-normal frequency currents.

19. In an alternating-current system of distribution including a plurality of supply means, one or more feeder circuits arranged to be energized by each of said supply means, a circuit breaker connecting each of said feeder circuits with its associated supply means, a common network load circuit and a network switch connecting each of said feeder circuits with said network load circuit, each of said network switches having an electromagnetic closing element, the combination including a source of other-than-normal frequency currents, a circuit interrupter connecting said source with one of said feeder circuits, control means for each of said network switches, each of said control means including means for connecting the corresponding closing element to one of said circuits when the corresponding feeder circuit is energized with said other-than-normal frequency currents, means for closing said circuit interrupter, means including time-delay means for opening said circuit interrupter and means responsive to a predetermined opening of said circuit breaker for closing said circuit interrupter.

20. In an alternating-current system of distribution including supply means, a feeder circuit, a circuit breaker connecting said feeder circuit to said supply means, a network load circuit and a network switch connecting said circuits, the combination including a first source of other-than-normal frequency currents, a first circuit interrupter connecting said source with one end of said feeder circuit, a second source of other-than-normal frequency currents, a second circuit interrupter connecting said second source with the other end of said feeder circuit, control means responsive to the first source currents for closing said network switch and responsive to both source currents for opening said network switch, means for closing said first circuit interrupter and means for closing said second circuit interrupter.

21. In an alternating-current system of distribution including a supply means, a feeder circuit, a circuit breaker connecting said feeder circuit to said supply means, a network load circuit and a network switch connecting said circuits, said network switch having closing and tripping means energized from one of said circuits, the combination including a source of other-than-normal frequency currents, a circuit interrupter connecting said source with said feeder circuit, control means responsive to the source currents for controlling said closing and tripping means, means for closing said circuit interrupter, means for opening said circuit interrupter after a predetermined time delay, control means for said circuit breaker and said circuit interrupter including means for preventing the closing of said circuit breaker when said circuit interrupter is closed and means controlled by the opening of said circuit breaker for closing said circuit interrupter.

22. In an alternating-current system of distribution including a supply source, a feeder circuit, a circuit breaker connecting said feeder circuit to said supply source, a network load circuit and a network switch connecting said circuits, said network switch having closing and tripping means energized from one of said circuits, the combination including a control source of other-than-normal frequency currents, a circuit interrupter connecting said control source with said feeder circuit, control means responsive to the source currents for controlling said closing and tripping means, operator-controlled means at the supply source for closing said circuit interrupter, time-delay means controlled by said operator-controlled means for automatically opening said circuit interrupter, a second means controlled by the operator for closing said circuit breaker when said circuit interrupter is either open or closed, relay means associated with said feeder circuit and said circuit breaker for opening said circuit breaker under predetermined system conditions and means controlled by said relay means for closing said circuit interrupter when said circuit breaker opens.

23. In an alternating-current system of distribution including a plurality of supply sources, one or more feeder circuits arranged to be energized by each of said supply sources, a feeder circuit breaker connecting each feeder circuit with its associated supply source, a network load circuit, a plurality of step-down transformers connecting each of said feeder circuits to said load circuit, and network switches interposed between said transformers and said load circuit, the combination including high voltage means for connecting the network load circuit ends of pairs of said feeder circuits to form loop circuits and means associated with each loop circuit for interrupting the loop connection upon the occurrence of fault or predetermined abnormal conditions on one of the feeder circuits in said loop circuit.

24. In an alternating-current system of distribution including a plurality of supply sources, one or more feeder circuits arranged to be energized by each of said supply sources, a feeder circuit breaker connecting each feeder circuit with its associated supply source, a network load circuit and a network switch connecting each of said feeder circuits with said network load circuit, the combination including means for connecting the network load circuit ends of pairs of said feeder circuits to form loop circuits, control means for each of said network switches, means for interrupting the loop connection between two feeder circuits and means responsive to said interruption for effecting the energization of the control means associated with one of said feeder circuits in said loop circuit.

25. In an alternating-current system of distribution including a plurality of supply sources, one or more feeder circuits arranged to be energized by each of said supply sources, a feeder circuit breaker connecting each of said feeder circuits to its associated supply source, a network load circuit and a network switch connecting each of said feeder circuits with said network load circuit, the combination including means for connecting the network load circuit ends of pairs of said feeder circuits to form loop circuits, control means for each of said network switches, directional relay means for interrupting the loop connection between two feeder circuits, means for effectively energizing the control means associated with one of said network switches in response to the actuation of said directional relay means.

26. In an alternating-current system of distribution including a plurality of supply circuits, a network load circuit and a network circuit breaker connecting each of said supply circuits with said load circuit, each of said network circuit breakers having tripping means energized from an adjacent one of said circuits, the combination including a source of other-than-normal frequency currents, a circuit interrupter connecting said source with one of said supply circuits, control means responsive to the source currents for controlling said tripping means, a switch for connecting the network load circuit ends of pairs of supply circuits to form loop circuits, relay means for controlling the closing and opening of each of said switches, a second source of other-than-normal frequency currents, circuit-interrupting means for connecting said second source to each supply circuit in one of said loop circuits and means controlled by the opening of one of said switches for closing the circuit-interrupting means associated with one of the supply circuits in the loop circuit completed by said one of said switches.

27. In an alternating-current system of distribution including a plurality of supply means, one or more feeder circuits arranged to be energized by each of said supply means, a feeder circuit breaker connecting each of said feeder circuits with its associated supply means, a network load circuit and a network switch connecting each of said feeder circuits with said network load circuit, each of said network switches having closing and opening means energized from an adjacent one of said circuits, the combination including means for connecting the network load circuit ends of pairs of said feeder circuits to form loop circuits, directional relay means associated with each loop circuit and arranged to control the interruption of its associated loop circuit, a source of other-than-normal frequency currents, a circuit interrupter connecting said source with each feeder circuit at the network load circuit end thereof, control means for each of said network switches, each of said control means including means responsive to said other-than-normal frequency currents for controlling the corresponding opening and closing means, and means controlled by the interruption of a loop circuit for closing the circuit interrupter associated with one of the feeder circuits in said interrupter loop circuit.

28. In an alternating-current system of distribution including a plurality of supply means, one or more feeder circuits arranged to be energized by each of said supply means, a feeder circuit breaker connecting each of said feeder circuits with its associated supply means, a network load circuit and a network switch connecting each of said feeder circuits with said network load circuit, the combination including a source of other-than-normal frequency currents, a circuit interrupter connecting said source with one of said feeder circuits, control means responsive to the source currents for controlling the opening and closing of each network switch, means for closing said circuit interrupter, means including time-delay means for opening said circuit interrupter, circuit-interrupting means for connecting the network load circuit ends of pairs of feeder circuits to form loop circuits, directional relay means associated with each loop circuit for controlling the opening of the circuit-interrupting means connecting the network load circuit ends of the feeder circuits in said loop circuit, a second source of other-than-normal frequency currents, a switch connecting said second source with each of the feeder circuits in said loop circuit and means controlled by the opening of said circuit-interrupting means for closing one of said switches.

29. In an alternating-current system of distribution including a supply circuit, a network load circuit and a network switch for connecting said circuits, said network switch having closing means energized from one of said circuits and opening means energized from one of said circuits, the combination including a source of other-than-normal frequency currents, a circuit interrupter connecting said source with one of said circuits and control means for automatically controlling said closing means and said opening means, said control means including relay means responsive to the source currents, means including time-delay means energized by the voltages of said circuits for effecting energization of said closing means and said opening means successively upon successive energizations of said relay means and transfer means for effecting the energization of said closing means in accordance with the voltage of said supply circuit when said load circuit is deenergized and in accordance with the voltage of the load circuit when said load circuit is energized.

30. In an alternating-current system of distribution including a supply circuit, a network load circuit and a network switch connecting said circuits, the combination including a source of other-than-normal frequency currents, a circuit interrupter connecting said source with said supply circuit, means for closing said circuit interrupter, means for opening said circuit interrupter after a predetermined time-delay, electromagnetic means energized from one of said circuits for closing and opening said network switch, and control means for said electromagnetic means, said control means including means arranged to be energized upon the closing of said circuit interrupter, relay means including time-delay means arranged to be energized by the voltage of either the supply circuit or the load circuit and transfer means for effecting the energization of said relay means in accordance with the supply circuit voltage when the load circuit is deenergized and in accordance with the load circuit voltage when the load circuit is energized.

31. In an alternating-current system of distribution including a plurality of supply means, one or more feeder circuits arranged to be energized by each of said supply means, a feeder circuit breaker connecting each of said feeder circuits with its associated supply means, a network load circuit and a network switch connecting each of said feeder circuits with said network load circuit, the combination including a source of other-than-normal frequency currents, a circuit interrupter connecting said source with the supply end of one of said feeder circuits, means for closing said circuit interrupter, means for opening said circuit interrupter after a predetermined time delay, control means for closing and opening said network switch including electro-responsive means energized by the source currents, relay means including time-delay means arranged to be energized by either the feeder circuit voltage or the load circuit voltage upon the energization of said electro-responsive means and transfer means associated with said load circuit for effecting the energization of said relay means in accordance with the feeder circuit voltage when the network load circuit is deenergized and in accordance with the network load circuit voltage when the network load circuit is energized, means for connecting the network load circuit ends of pairs of said feeder circuits to form loop feeder circuits, directional relay means for interrupting each of said loop circuits, a second source of other-than-normal frequency currents, switching means connecting said second source with the network load circuit end of one of the feeder-circuits in one of said loop circuits and means controlled by the interrupting of said loop circuit for closing said switching means.

JOHN S. PARSONS.